(12) United States Patent
Takatsuka

(10) Patent No.: US 12,284,457 B2
(45) Date of Patent: Apr. 22, 2025

(54) PHOTODETECTION DEVICE, IMAGING UNIT, AND DISTANCE MEASUREMENT APPARATUS

(71) Applicant: Sony Semiconductor Solutions Corporation, Kanagawa (JP)

(72) Inventor: Takafumi Takatsuka, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 18/697,290

(22) PCT Filed: Aug. 16, 2022

(86) PCT No.: PCT/JP2022/030933
§ 371 (c)(1),
(2) Date: Mar. 29, 2024

(87) PCT Pub. No.: WO2023/089884
PCT Pub. Date: May 25, 2023

(65) Prior Publication Data
US 2024/0397234 A1  Nov. 28, 2024

(30) Foreign Application Priority Data
Nov. 22, 2021  (JP) .................. 2021-189721

(51) Int. Cl.
*H04N 25/773*  (2023.01)
*G01S 17/14*  (2020.01)
*H04N 25/771*  (2023.01)

(52) U.S. Cl.
CPC ......... *H04N 25/773* (2023.01); *H04N 25/771* (2023.01); *G01S 17/14* (2020.01)

(58) Field of Classification Search
CPC .... H04N 25/773; H04N 25/771; H04N 25/78; H04N 25/70; G01S 17/14
See application file for complete search history.

(56) References Cited

U.S. PATENT DOCUMENTS

| | | | | |
|---|---|---|---|---|
| 6,323,942 | B1* | 11/2001 | Bamji | .................... H04N 3/155 |
| | | | | 348/E3.018 |
| 2017/0187939 | A1* | 6/2017 | Kasuga | ................. H04N 25/773 |
| 2017/0299417 | A1* | 10/2017 | Otagaki | ................ G01F 23/266 |
| 2018/0039882 | A1* | 2/2018 | Ikeda | ..................... G06N 3/065 |
| 2020/0170586 | A1* | 6/2020 | Takahashi | ................ G01T 1/36 |

FOREIGN PATENT DOCUMENTS

| | | |
|---|---|---|
| JP | 2021106180 A | 7/2021 |
| WO | 2016042734 A1 | 3/2016 |

OTHER PUBLICATIONS

International Search Report (PCT/ISA/210), International Application No. PCT/JP2022/030933, dated Oct. 4, 2022.

\* cited by examiner

*Primary Examiner* — Thanh Luu
*Assistant Examiner* — Mai Thi Ngoc Tran
(74) *Attorney, Agent, or Firm* — Michael Best & Friedrich LLP

(57) ABSTRACT

A photodetection device according to an embodiment of the present disclosure includes a pulse responder, an analog counter part, and a resetter. The pulse responder generates a pulse signal in response to light incidence. The analog counter part generates an analog first count value by performing count processing on the basis of the pulse signal. The resetter resets the first count value when the first count value exceeds a first threshold.

15 Claims, 22 Drawing Sheets

[ FIG. 1 ]
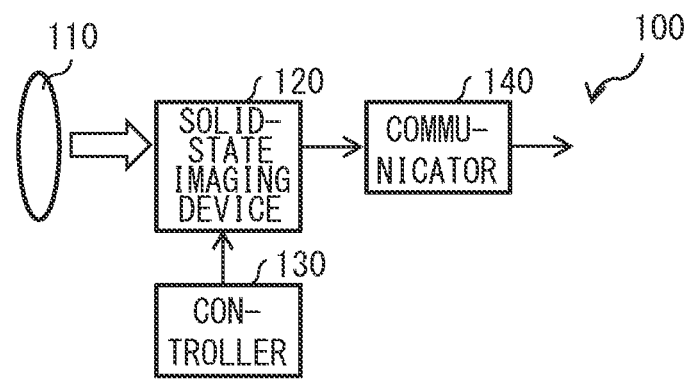
[ FIG. 2 ]
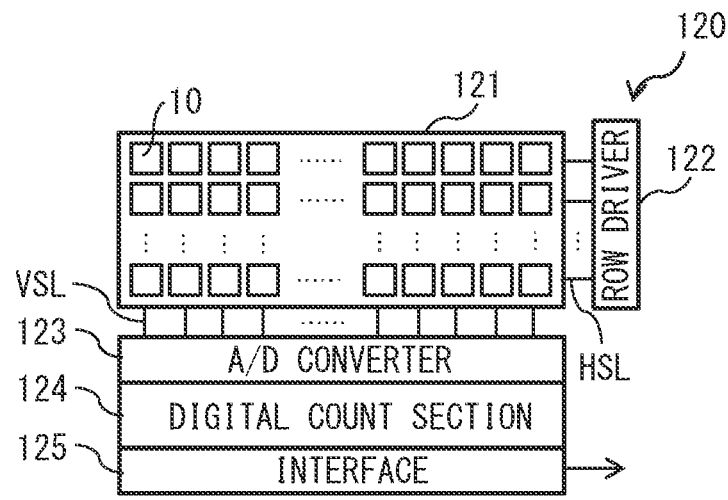

[FIG. 3]
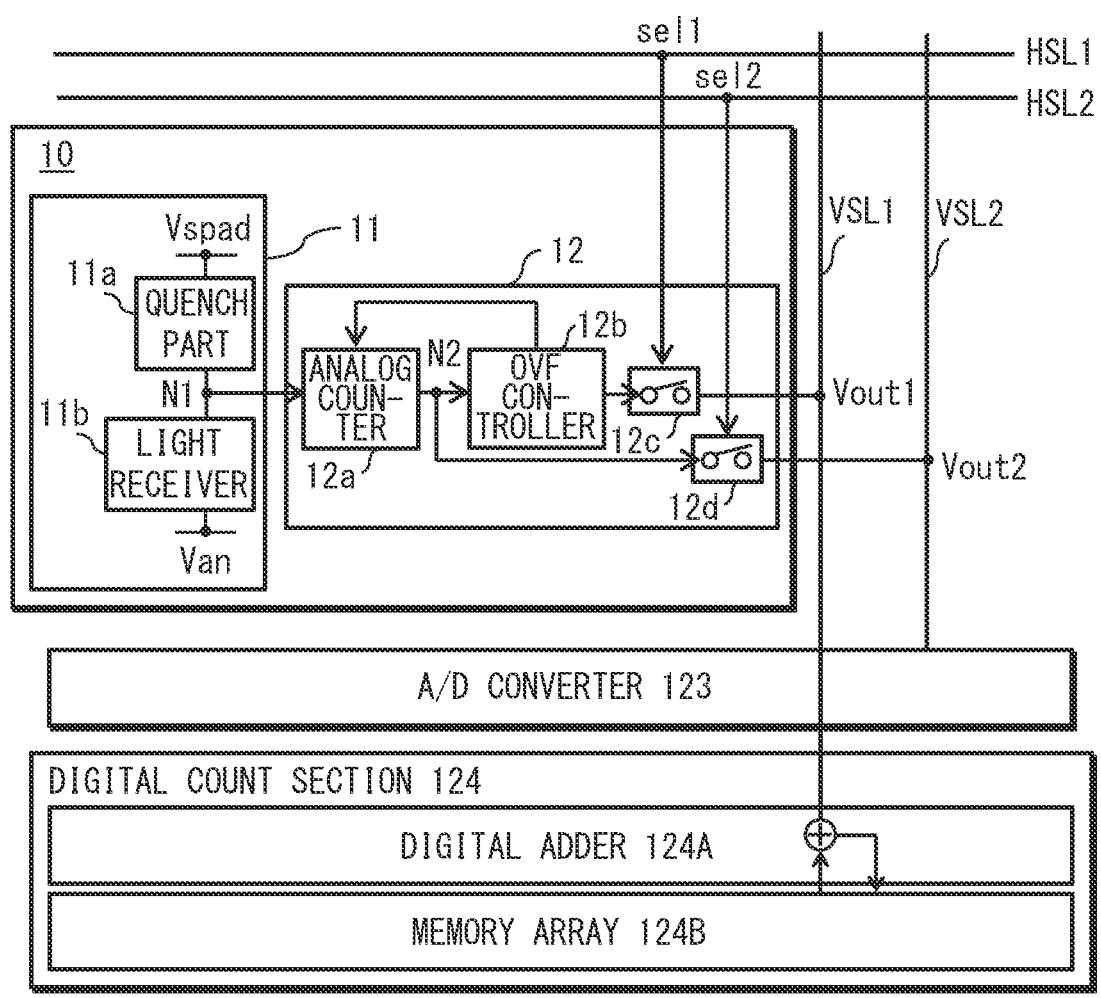

[ FIG. 4 ]
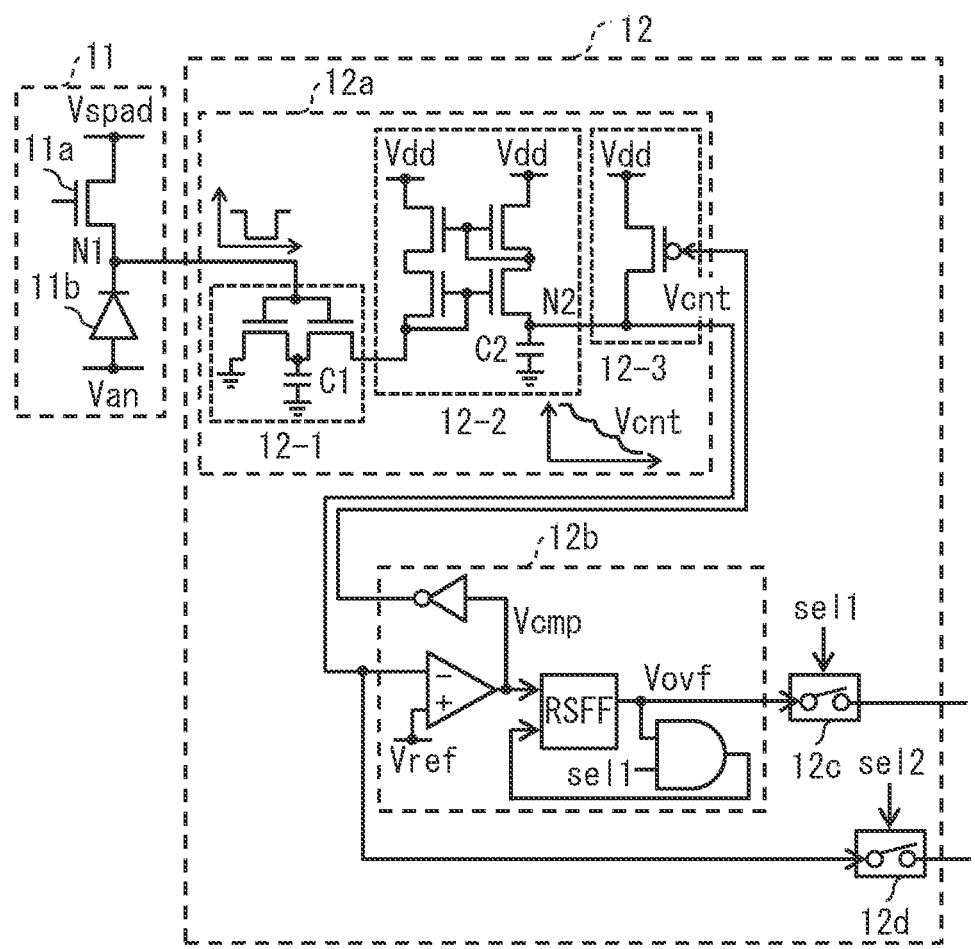

[FIG. 5]
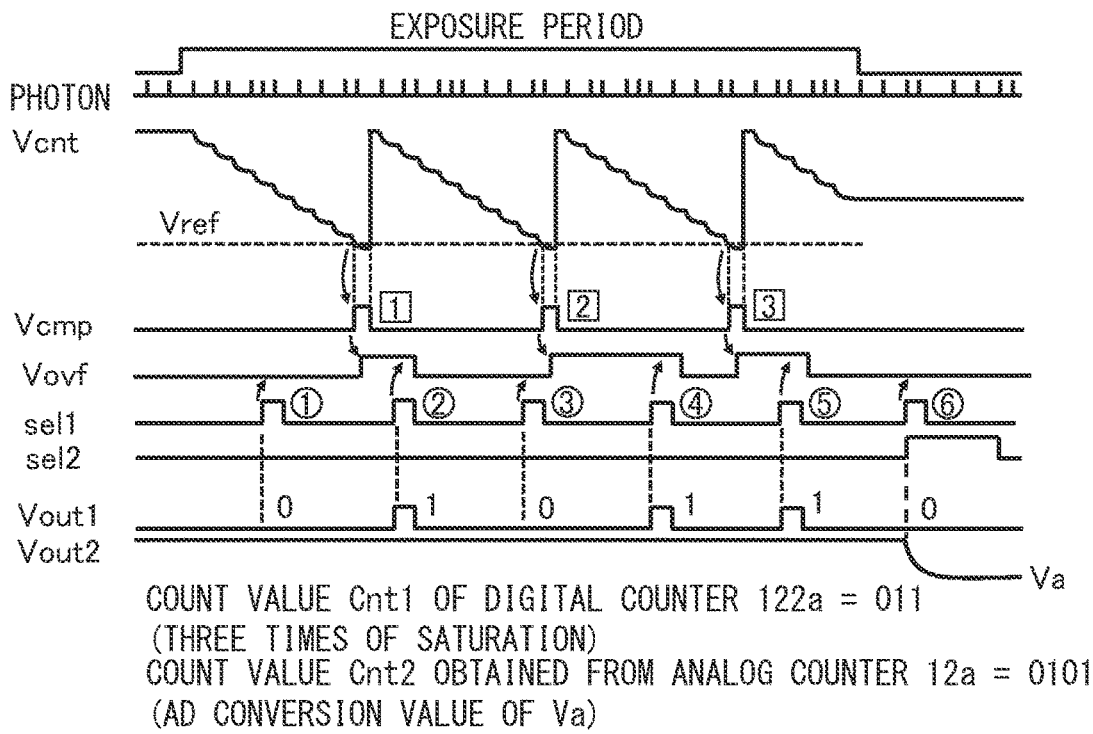
COUNT VALUE Cnt1 OF DIGITAL COUNTER 122a = 011
(THREE TIMES OF SATURATION)
COUNT VALUE Cnt2 OBTAINED FROM ANALOG COUNTER 12a = 0101
(AD CONVERSION VALUE OF Va)
[FIG. 6]
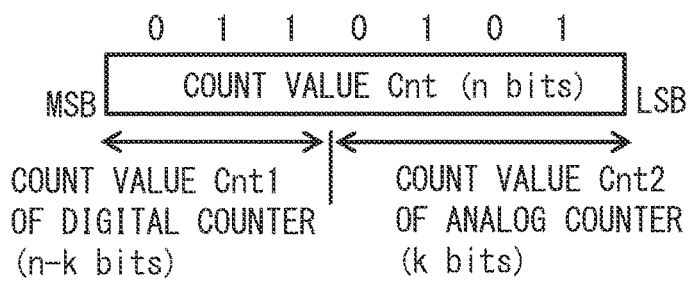
[FIG. 7]
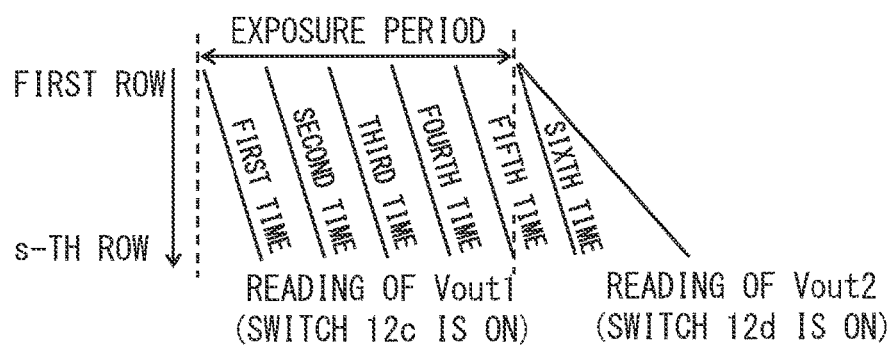

[ FIG. 8 ]
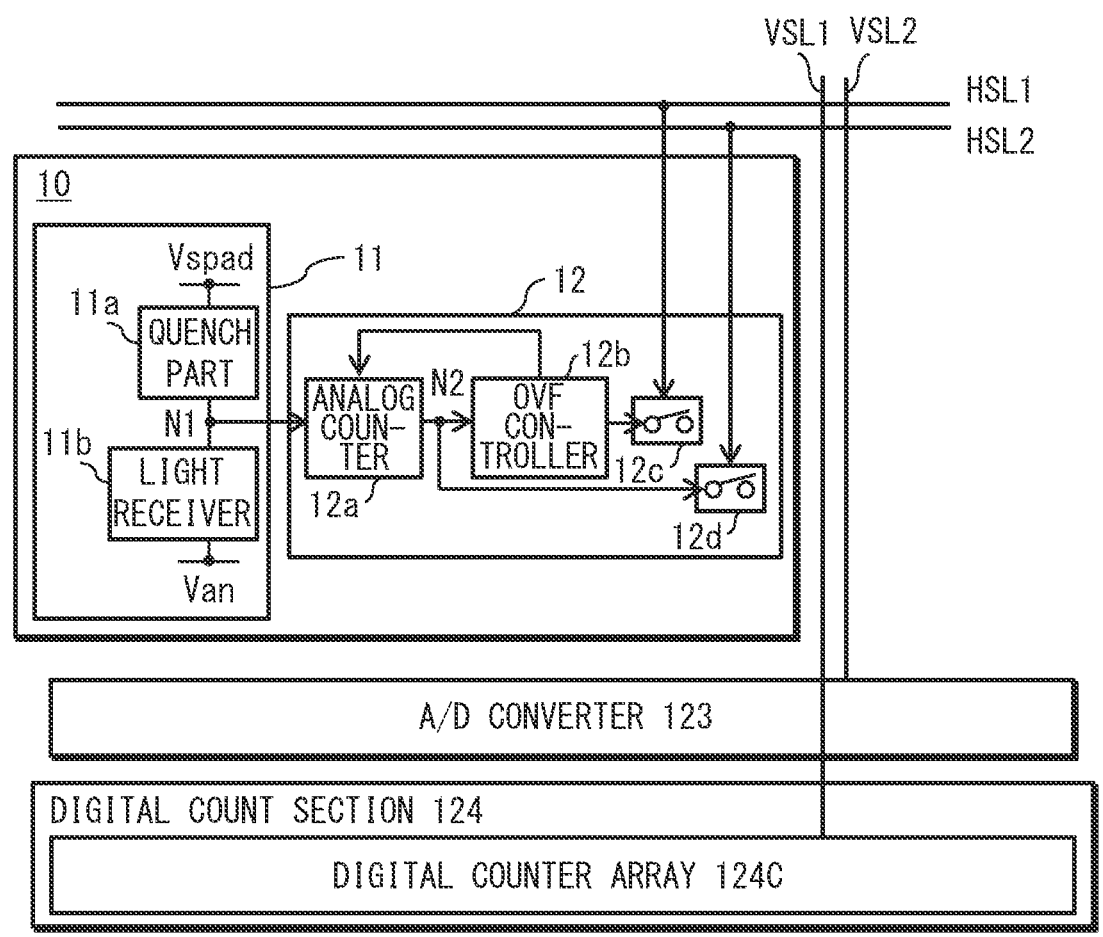

[ FIG. 9 ]
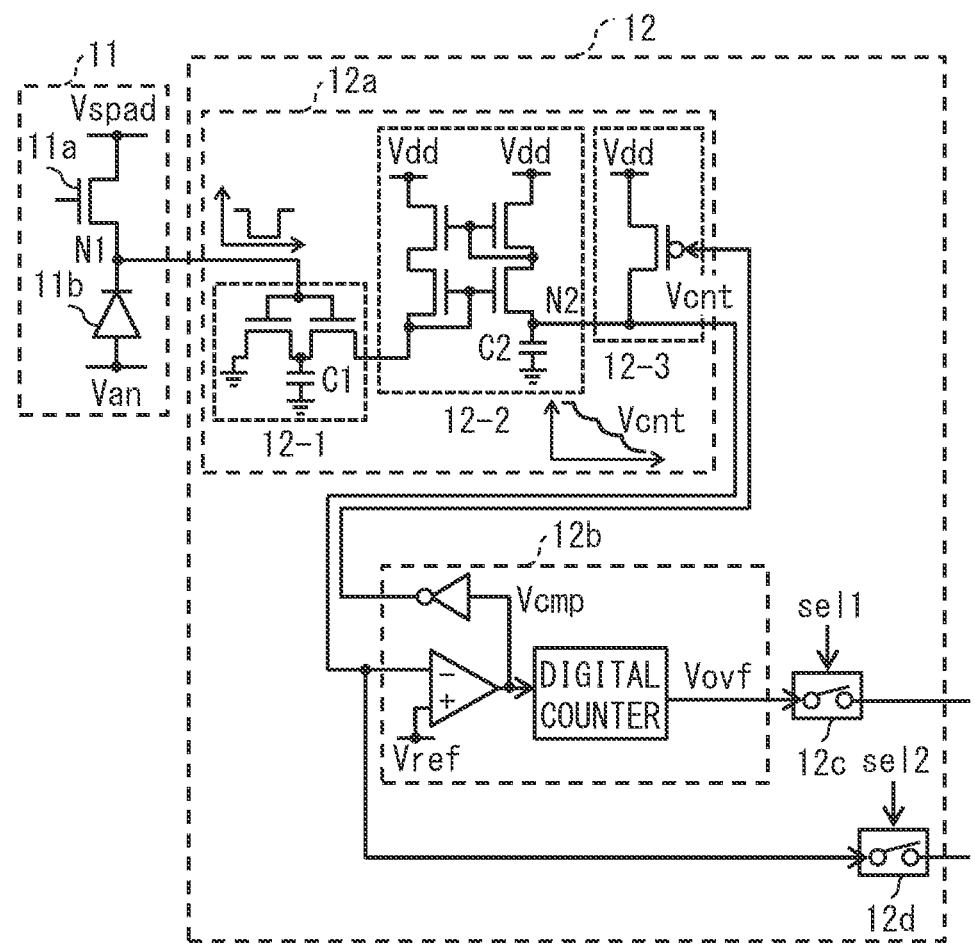

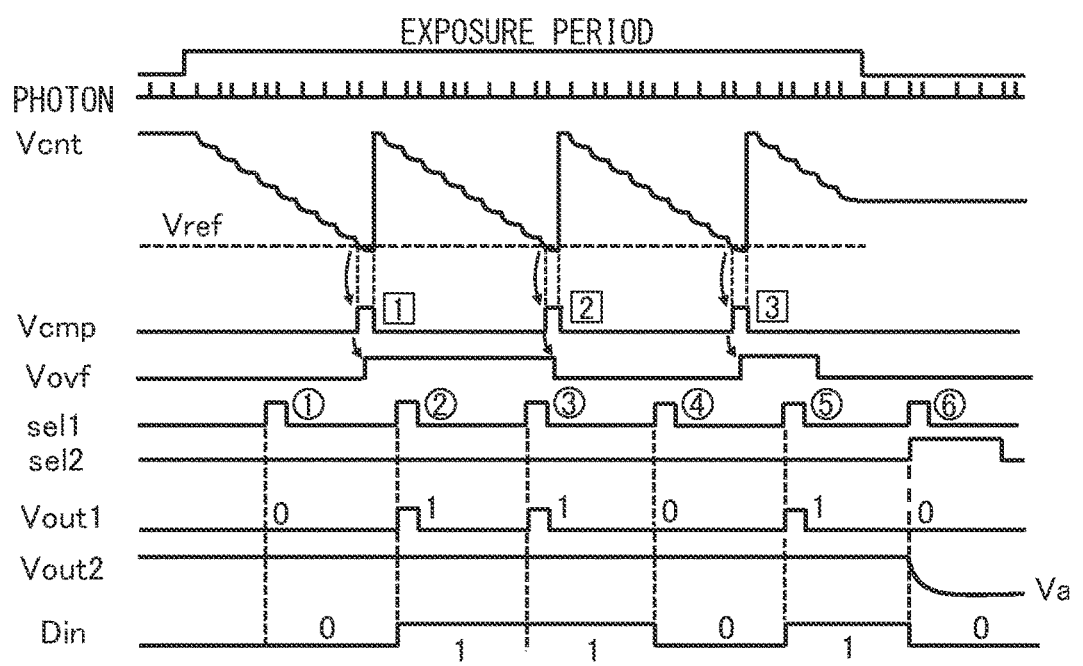
[ FIG. 10 ]

[ FIG. 11 ]
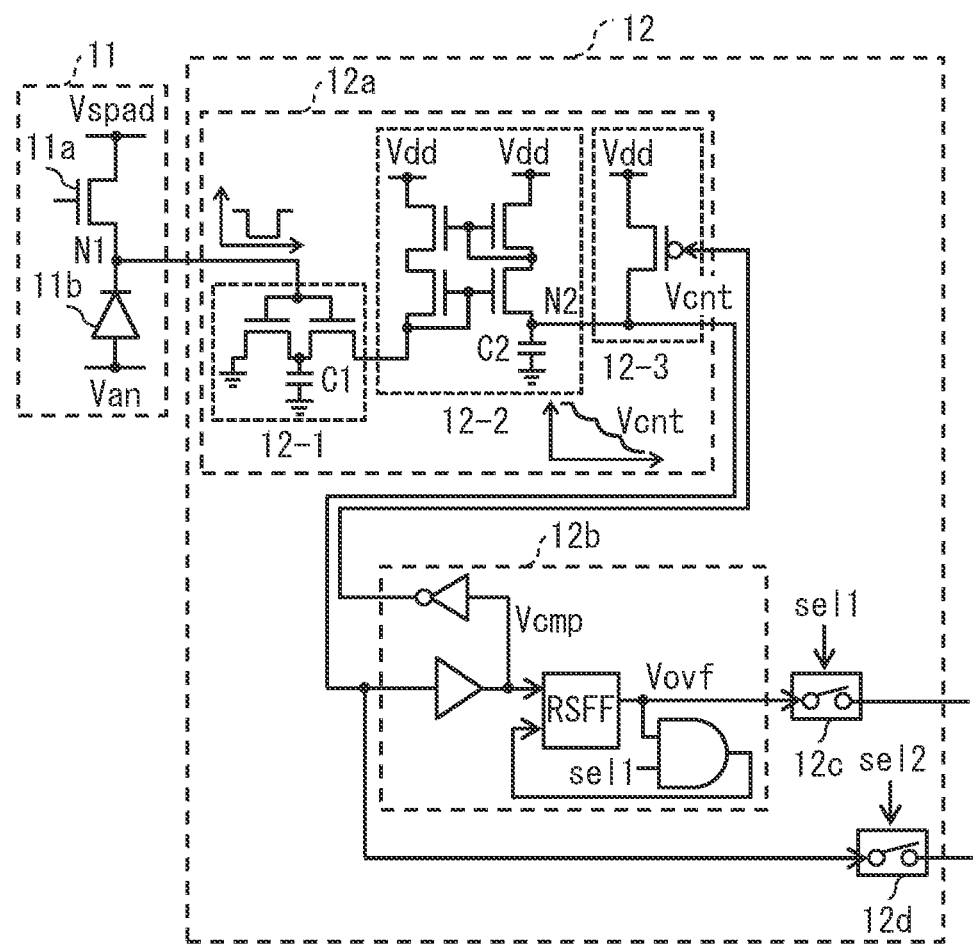

[ FIG. 12 ]
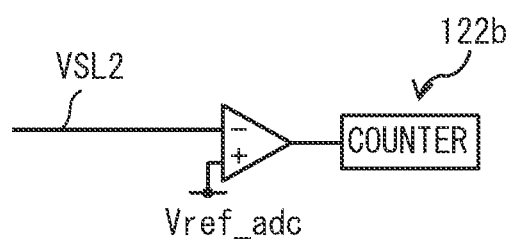
[ FIG. 13 ]
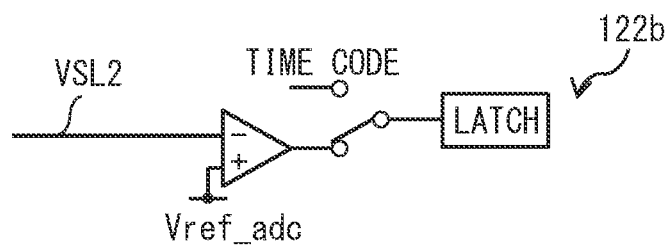

[ FIG. 14 ]
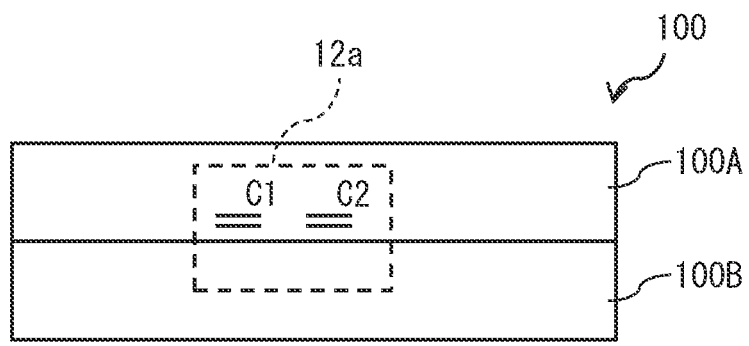
[ FIG. 15 ]
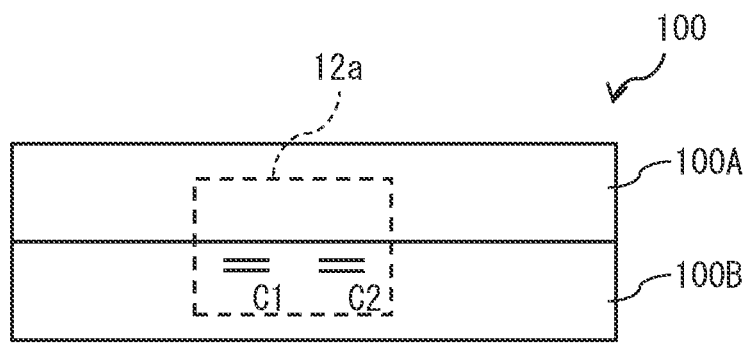
[ FIG. 16 ]
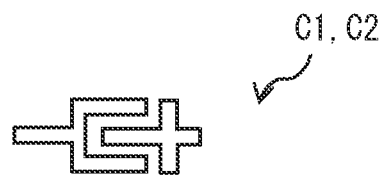

[ FIG. 17 ]
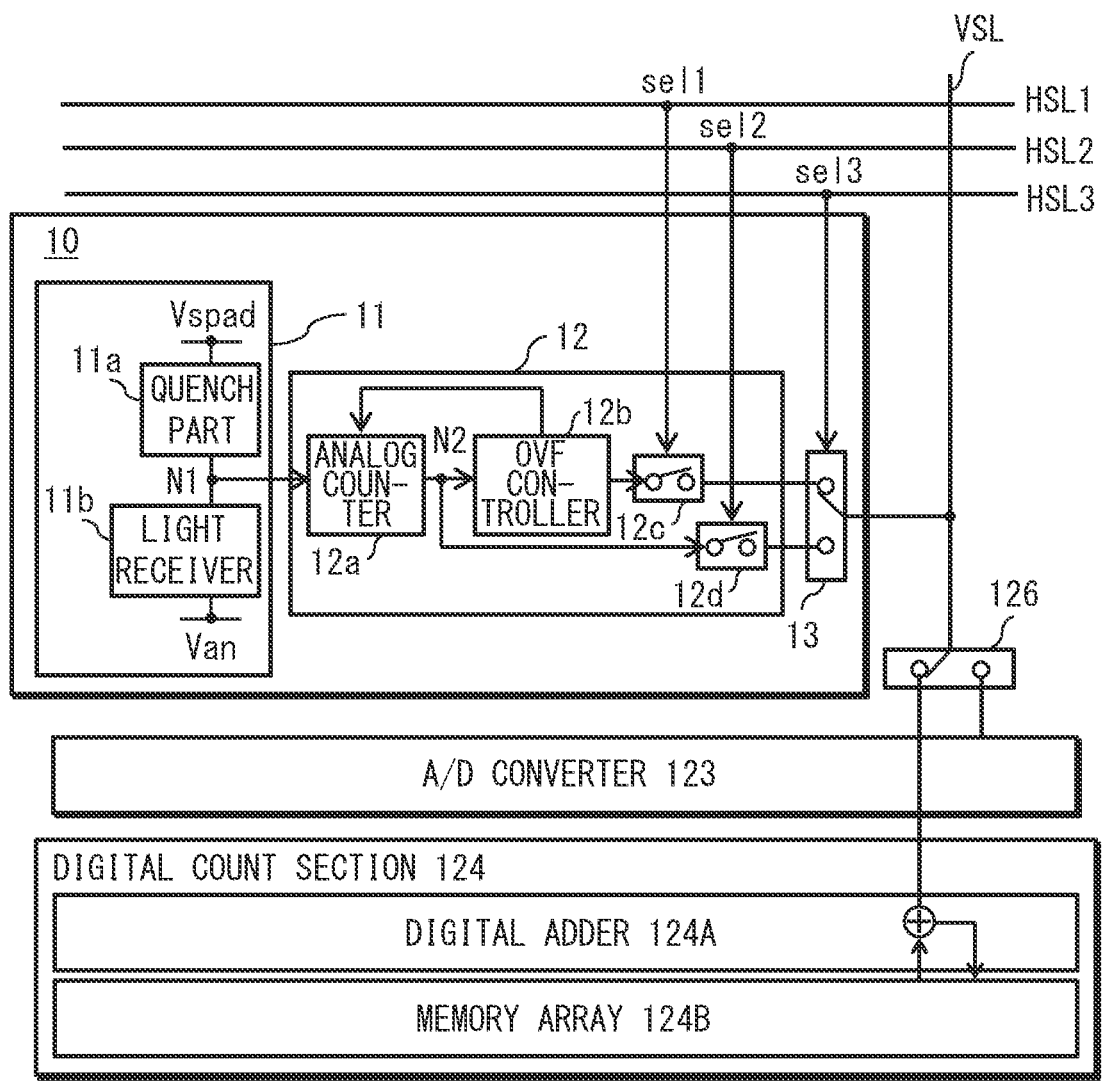

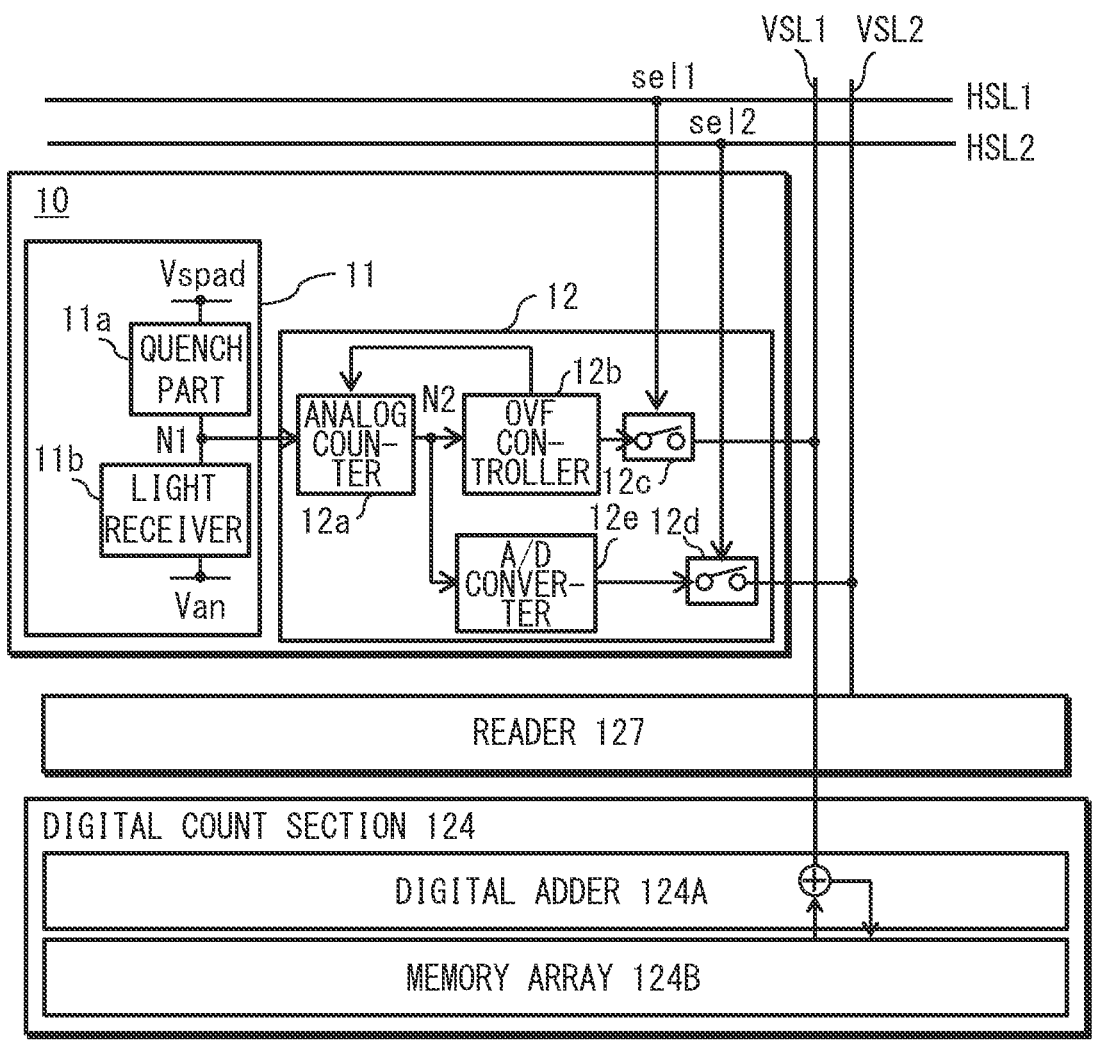
[ FIG. 18 ]

[ FIG. 19 ]
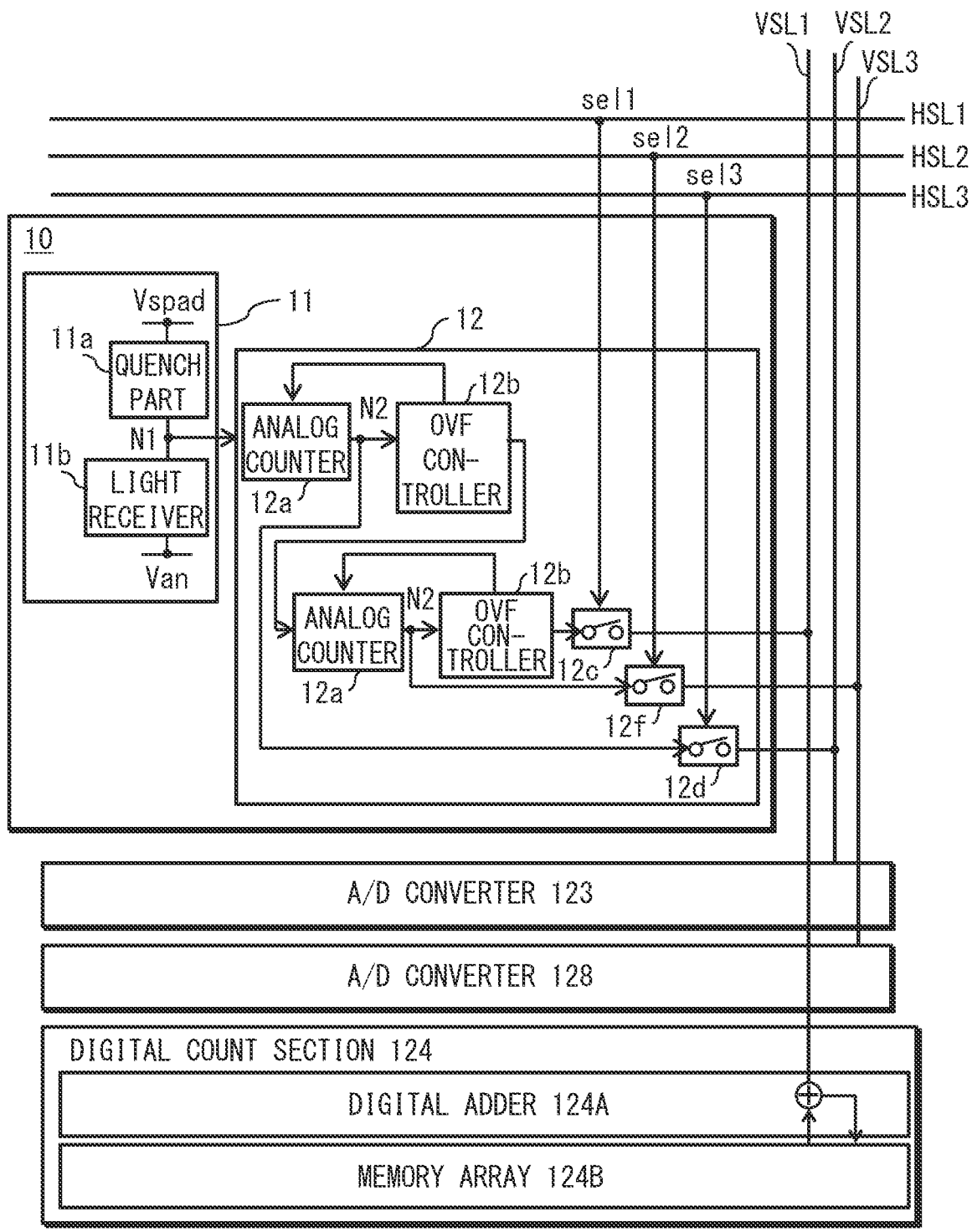

[ FIG. 20 ]
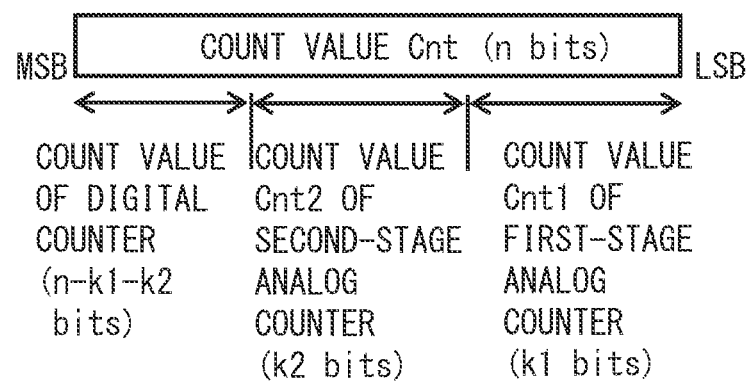

[ FIG. 21 ]
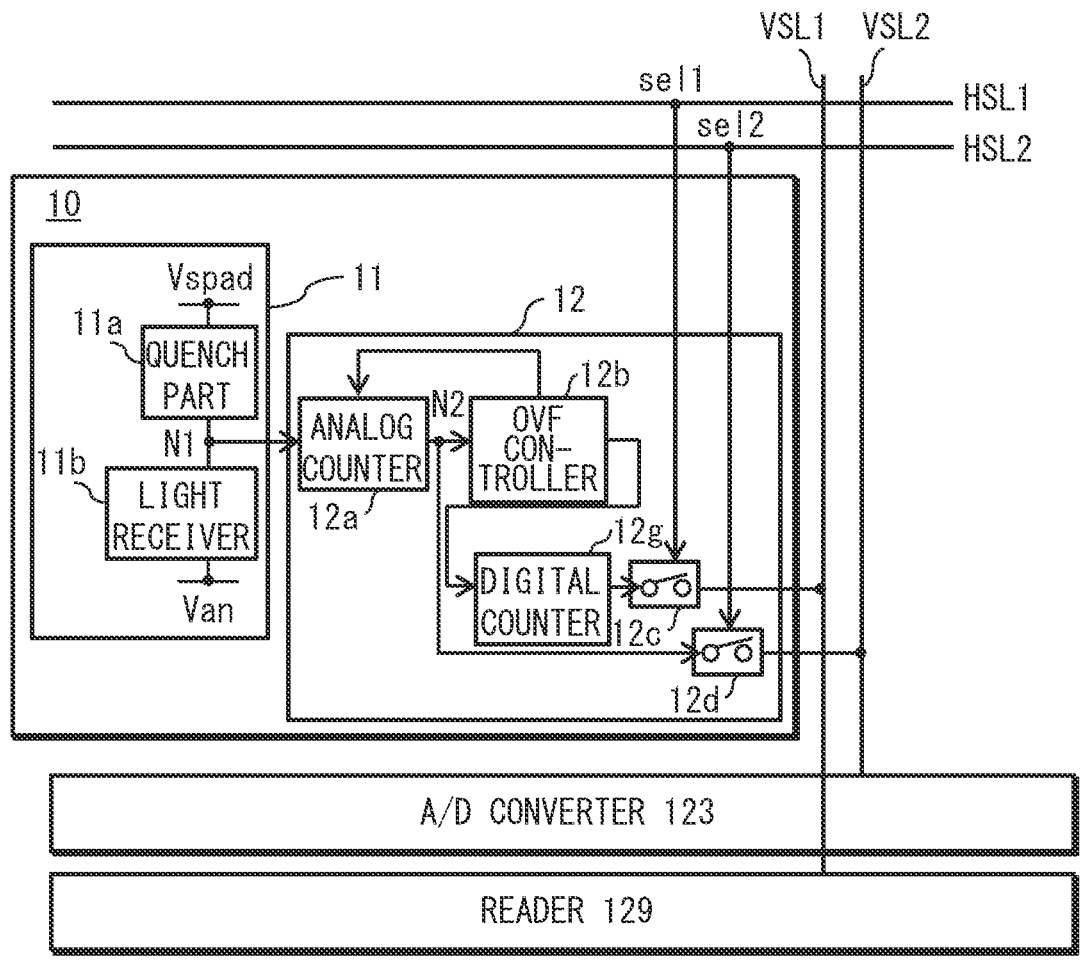
[ FIG. 22 ]
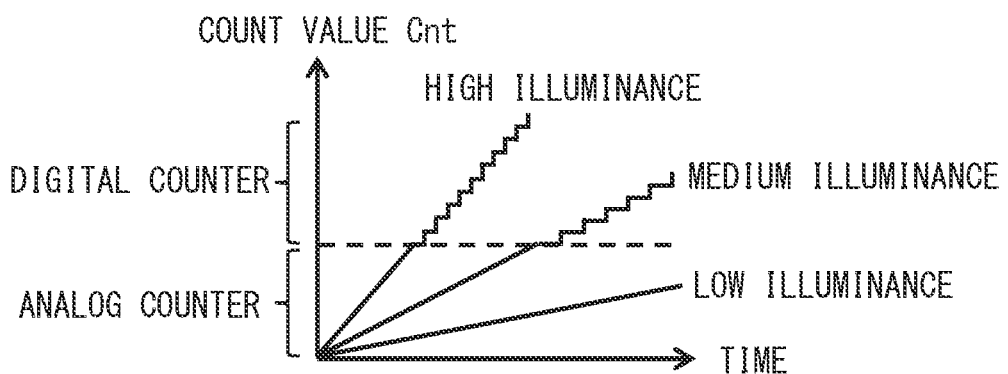

[ FIG. 23 ]
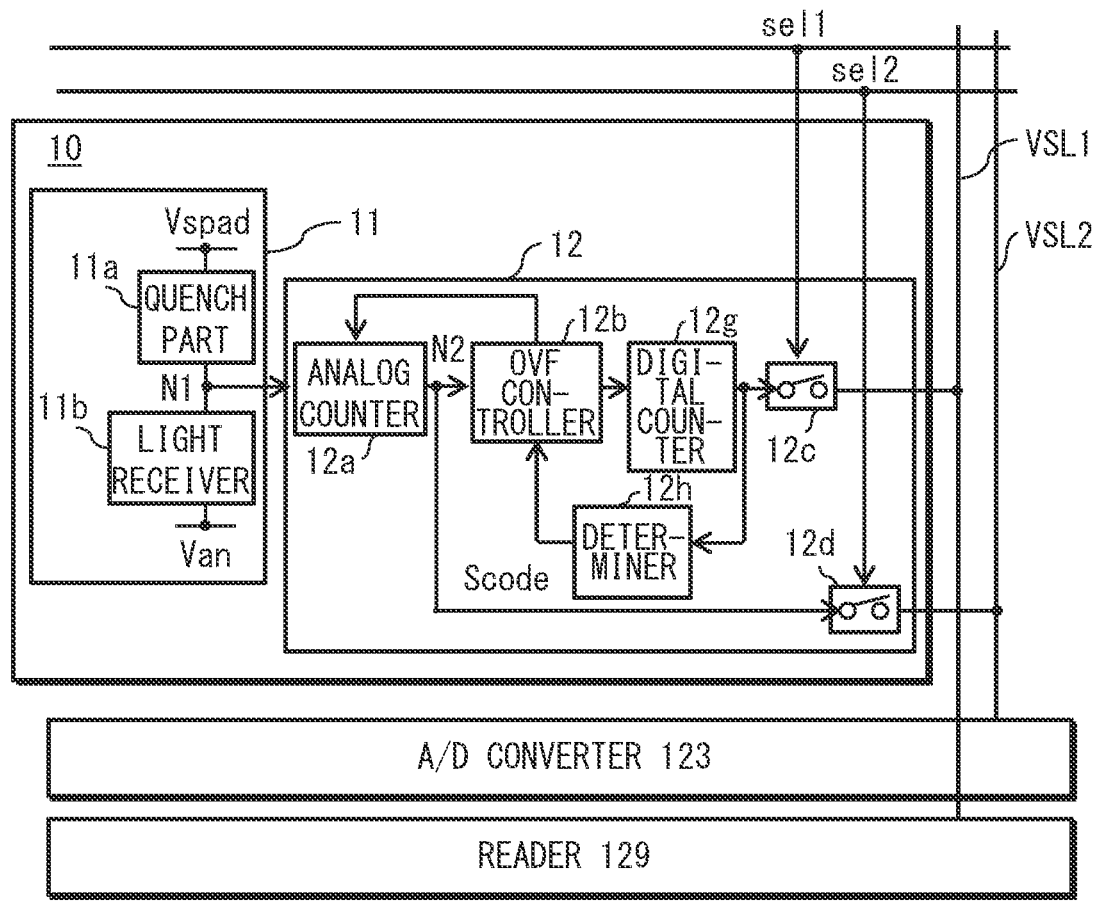
[ FIG. 24 ]
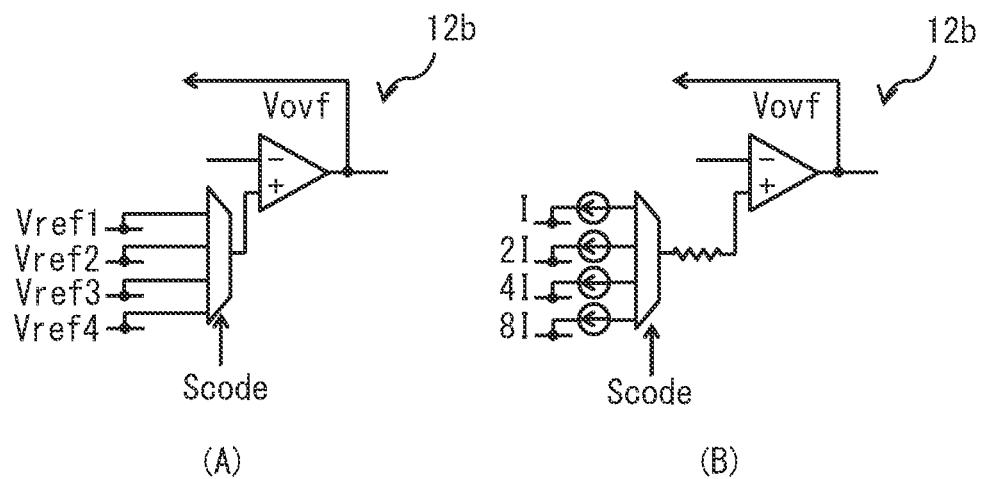
(A)   (B)

[ FIG. 25 ]
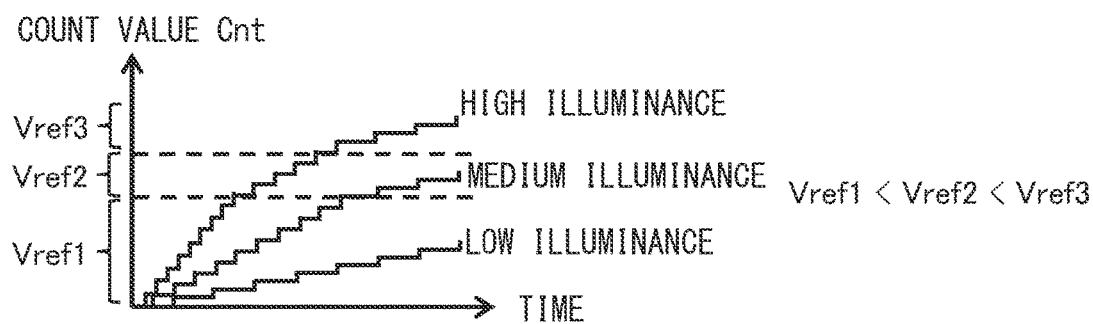
[ FIG. 26 ]
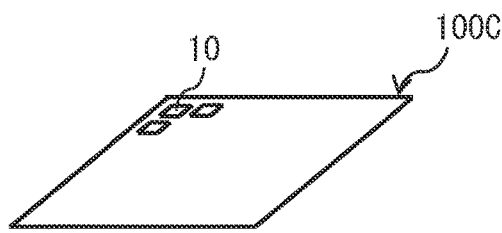
[ FIG. 27 ]
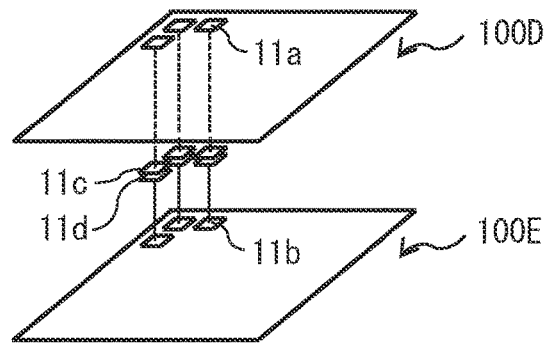

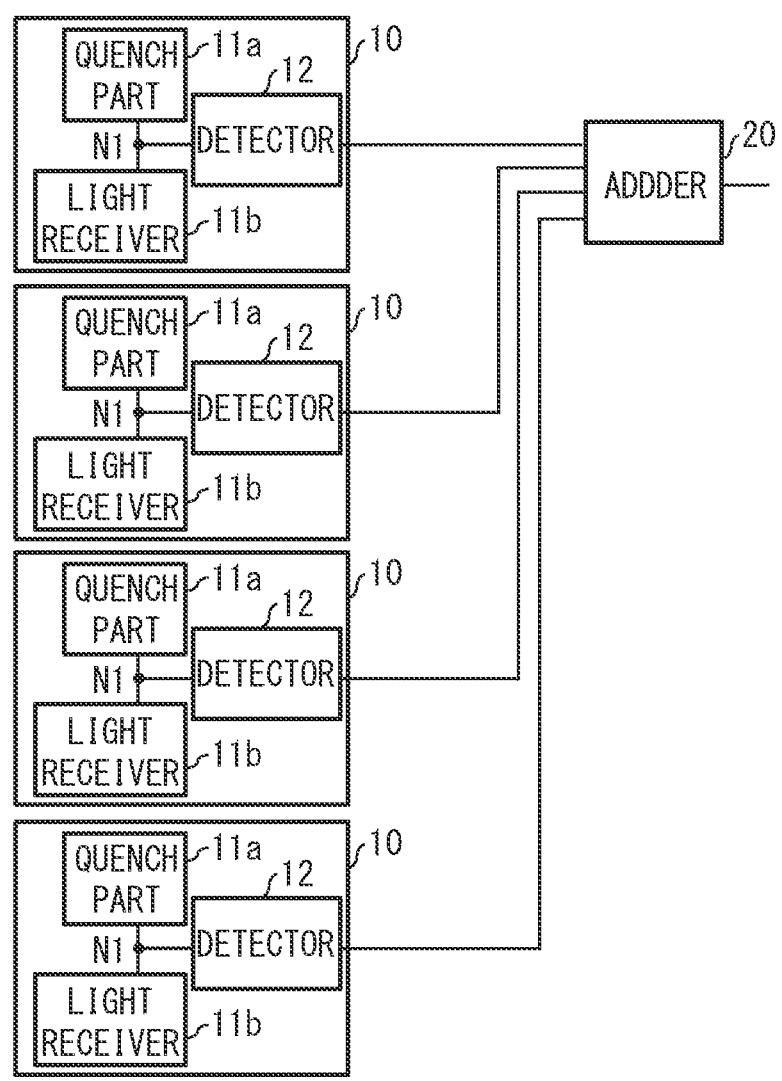
[ FIG. 28 ]

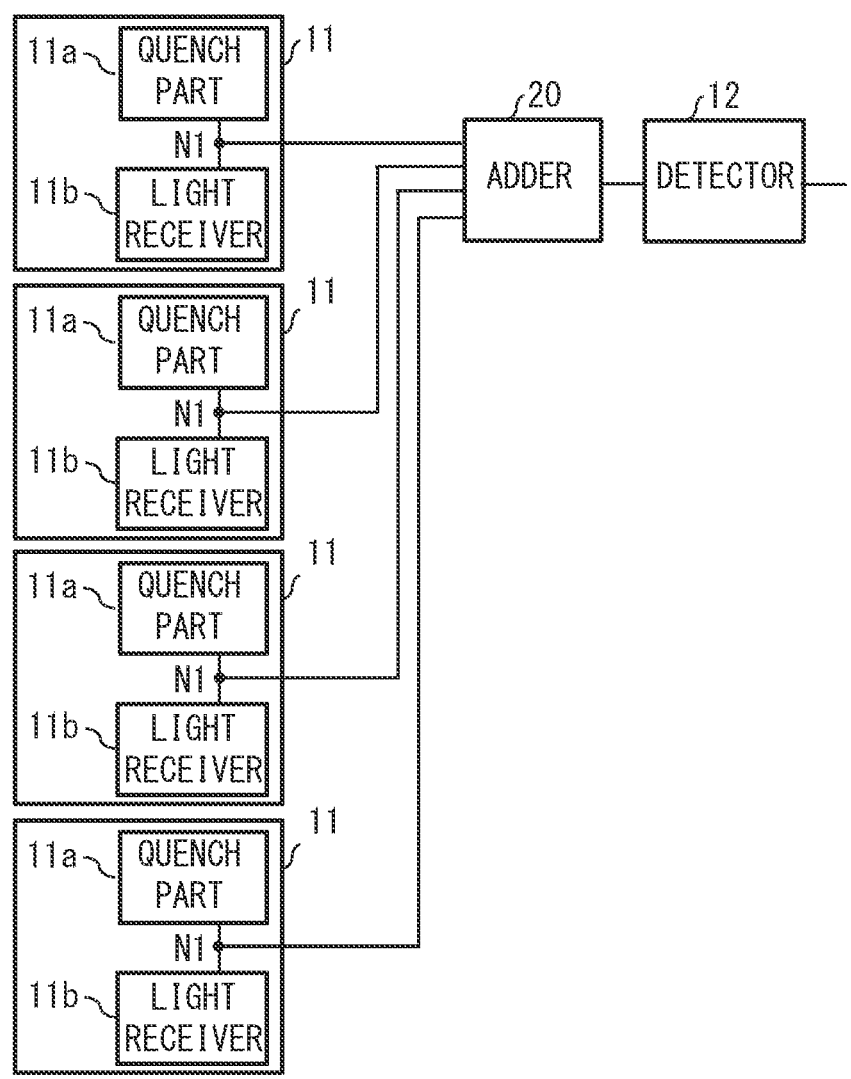
[ FIG. 29 ]

[ FIG. 30 ]
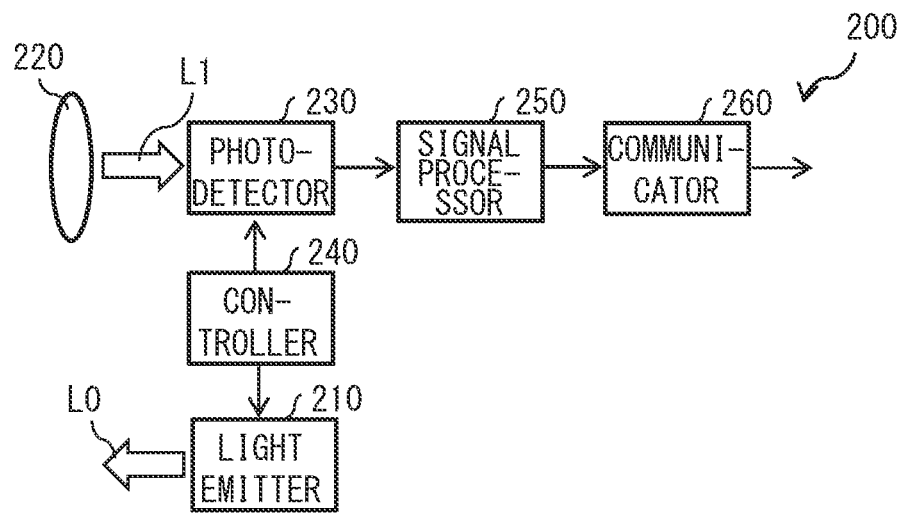
[ FIG. 31 ]
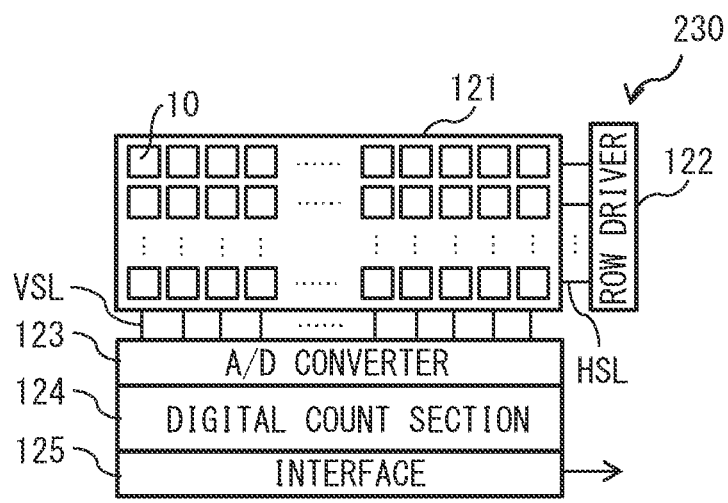

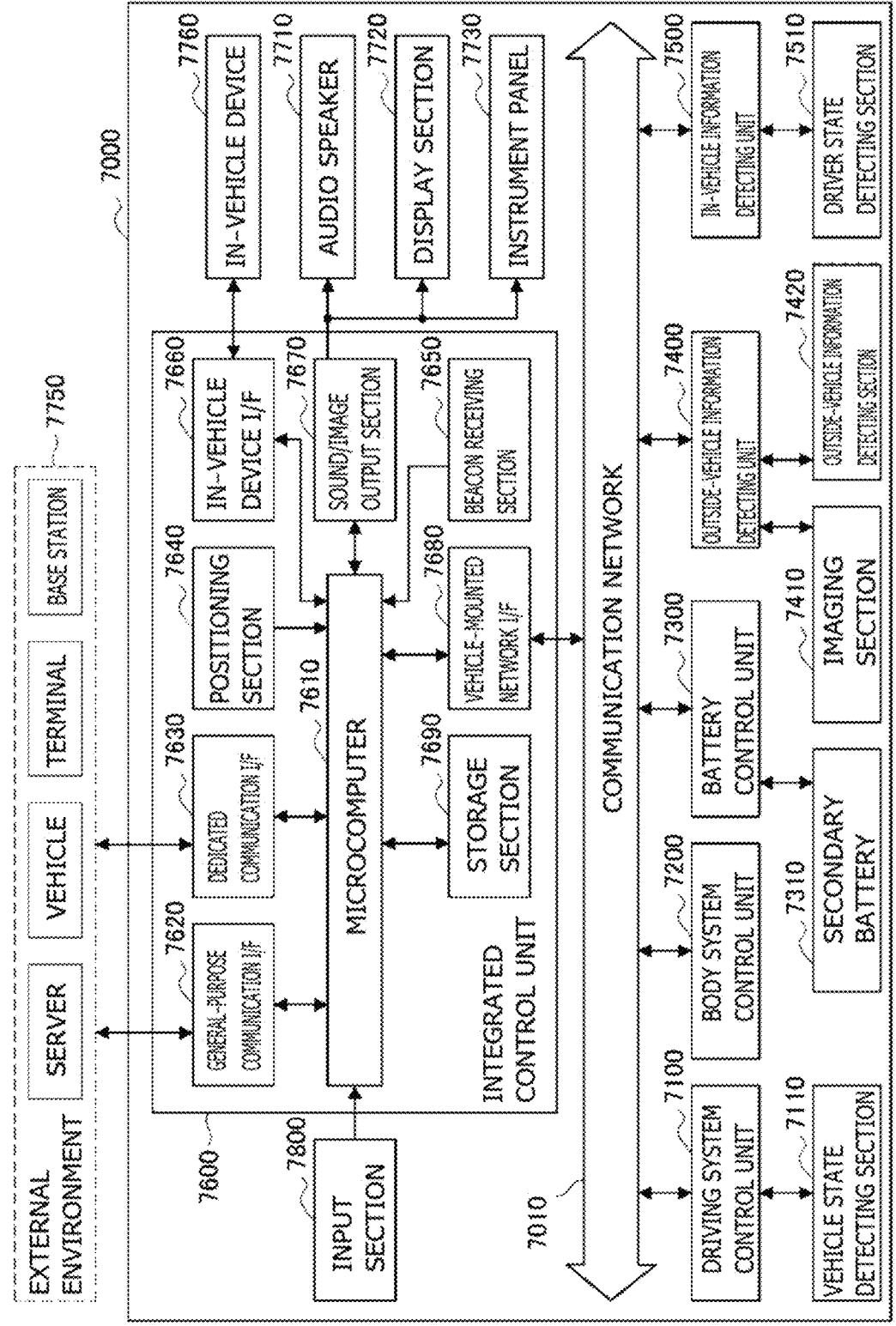
[FIG 32]

[ FIG. 33 ]
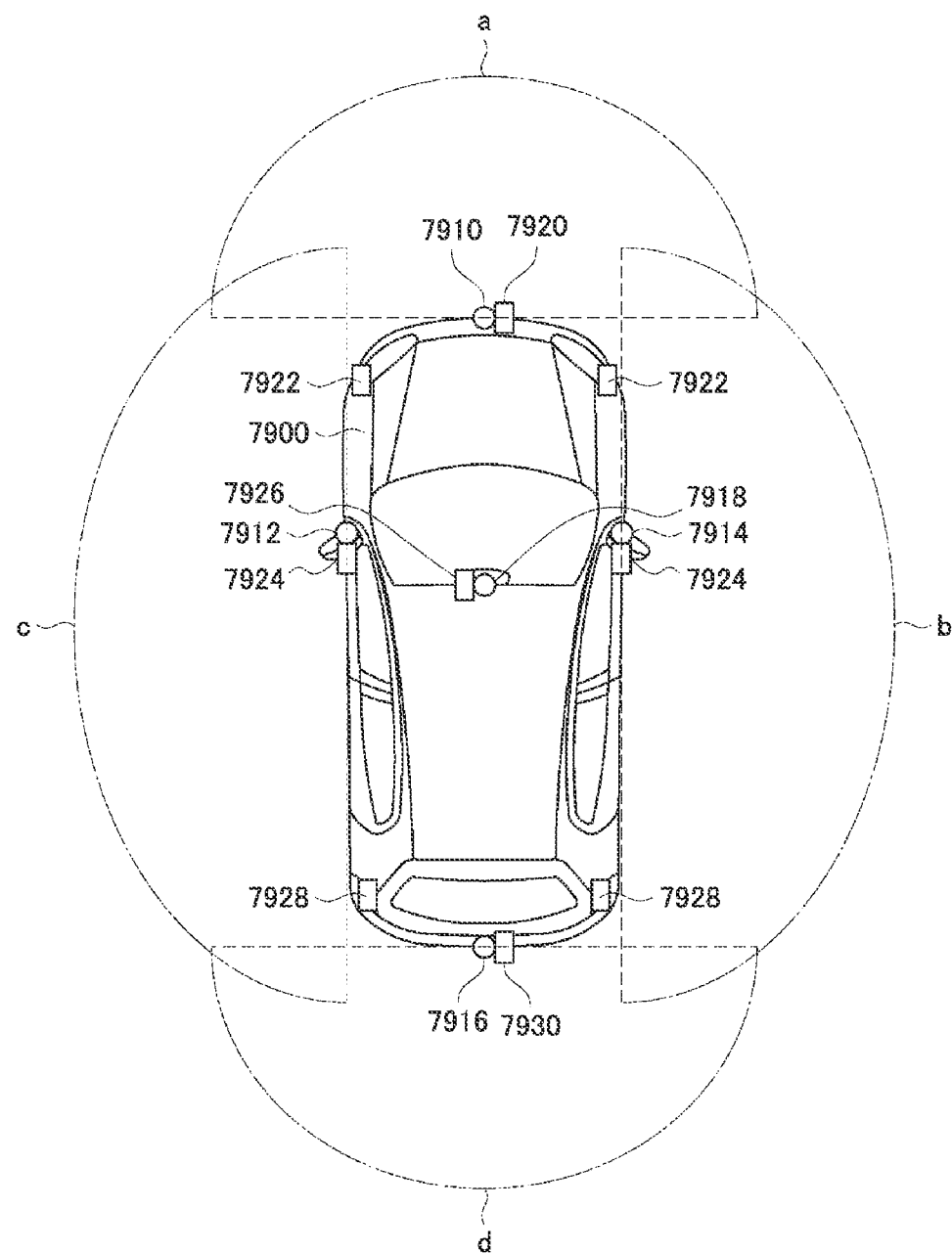

PHOTODETECTION DEVICE, IMAGING UNIT, AND DISTANCE MEASUREMENT APPARATUS

TECHNICAL FIELD

The present disclosure relates to a photodetection device, an imaging unit, and a distance measurement apparatus that use an avalanche photodiode (APD).

BACKGROUND ART

In a photodetection device using an APD, an analog counter has heretofore been provided in a subsequent stage of the APD) In such a case, however, it is possible to use only a signal of about 7 bit to 9 bit, for example, as an output signal of a 4V analog counter due to an influence of intra-pixel leakage or capacitance variation. Accordingly, an application involving a large number of times of reading has an issue of limitation on a frame rate because of time used for A/D conversion. To address this issue, for example, it is conceivable to use a 1-bit digital counter in addition to the analog counter to expand the number of bits of the output signal by 1 bit (see PTL 1).

CITATION LIST

Patent Literature

PTL 1: International Publication No. WO2016/042734

SUMMARY OF THE INVENTION

In a method described in PTL 1, however, analog values are read a plurality of times at a timing of reading, making it unable to essentially solve limitation on a frame rate. Accordingly, it is desirable to provide a photodetection device, an imaging unit, and a distance measurement apparatus that make it possible to reduce limitation on a frame rate while using an analog counter.

A photodetection device according to a first embodiment of the present disclosure includes a pulse responder, an analog counter part, and a resetter. The pulse responder generates a pulse signal in response to light incidence. The analog counter part generates an analog first count value by performing count processing on the basis of the pulse signal. The resetter resets the first count value when the first Count value exceeds a first threshold.

An imaging unit according to a second embodiment of the present disclosure includes a plurality of pixels disposed in a matrix form, and a signal processor that generates image data on the basis of pixel data obtained from each of the pixels. Each of the pixels includes a pulse responder, an analog counter part, and a resetter. The pulse responder generates a pulse signal in response to light incidence. The analog counter part generates an analog first count value by performing count processing on the basis of the pulse signal. The resetter resets the first count value when the first count value exceeds a first threshold.

A distance measurement apparatus according to a third embodiment of the present disclosure includes a photodetection device, and a signal processing circuit that calculates, from an output signal of the photodetection device, a distance to a measurement target. The photodetection device includes a pulse responder, an analog counter part, and a resetter. The pulse responder generates a pulse signal in response to light incidence. The analog counter part generates an analog first count value by performing count processing on the basis of the pulse signal. The resetter resets the first count value when the first count value exceeds a first threshold.

In the photodetection device according to the first embodiment of the present disclosure, the imaging unit according to the second embodiment of the present disclosure, and the distance measurement apparatus according to the third embodiment of the present disclosure, the count value of the analog counter part is reset in a subsequent stage of the analog counter part when the count value of the analog counter part exceeds a predetermined threshold. It is thus possible, for example, to count lower bits by the analog counter part and count higher bits by another counter (for example, a digital counter).

BRIEF DESCRIPTION OF DRAWINGS

FIG. 1 is a diagram illustrating an example of functional blocks of an imaging unit according to a first embodiment of the present disclosure.

FIG. 2 is a diagram illustrating an example of a schematic configuration of a solid-state imaging device of FIG. 1.

FIG. 3 is a diagram illustrating an example of functional blocks of a pixel and a peripheral circuit of FIG. 2.

FIG. 4 is a diagram illustrating an example of a circuit configuration of a detector of FIG. 3.

FIG. 5 is a diagram illustrating an example of signal waveforms in the detector of FIG. 4.

FIG. 6 is a diagram illustrating an example of a count value outputted from the pixel of FIGS. 3 and 4.

FIG. 7 is a diagram illustrating a concept of an operation of reading a signal from a pixel array section of FIG. 2.

FIG. 8 is a diagram illustrating a modification example of a circuit configuration of the pixel and the peripheral circuit of FIG. 2.

FIG. 9 is a diagram illustrating a modification example of the circuit configuration of the detector of FIG. 3.

FIG. 10 is a diagram illustrating an example of signal waveforms in the detector of FIG. 9.

FIG. 11 is a diagram illustrating a modification example of the circuit configuration of the detector of FIG. 3.

FIG. 12 is a diagram illustrating an example of a circuit configuration that can replace an A/D converter of FIGS. 3 and 8.

FIG. 13 is a diagram illustrating an example of a circuit configuration that can replace the A/D converter of FIGS. 3 and 8.

FIG. 14 is a diagram illustrating an example of arrangement of capacitors in an analog counter of FIGS. 4, 9, and 11, FIG. 15 is a diagram illustrating an example of arrangement of the capacitors in the analog counter of FIGS. 4, 9, and 11.

FIG. 16 is a diagram illustrating an example of a planar configuration of the capacitors in the analog counter of FIGS. 4, 9, and 11.

FIG. 17 is a diagram illustrating a modification example of the functional blocks of the pixel and the peripheral circuit of FIG. 2.

FIG. 18 is a diagram illustrating a modification example of the functional blocks of the pixel and the peripheral circuit of FIG. 2.

FIG. 19 is a diagram illustrating a modification example of the functional blocks of the pixel and the peripheral circuit of FIG. 2.

FIG. 20 is a diagram illustrating an example of a count value outputted from the pixel of FIG. 19.

FIG. 21 is a diagram illustrating a modification example of the functional blocks of the pixel and the peripheral circuit of FIG. 2.

FIG. 22 is a diagram illustrating an example of a temporal change in the count value obtained from the pixel of FIG. 21.

FIG. 23 is a diagram illustrating a modification example of the functional blocks of the pixel and the peripheral circuit of FIG. 2.

FIG. 24 is a diagram illustrating an example of reference resistance in an OVF controller of FIG. 23.

FIG. 25 is a diagram illustrating an example of a temporal change in the count value obtained from the pixel of FIG. 23.

FIG. 26 is a diagram illustrating a state in which the imaging unit of FIG. 1 is configured by one chip.

FIG. 27 is a diagram illustrating a state in which the imaging unit of FIG. 1 is configured by a stack of two chips.

FIG. 28 is a diagram illustrating a modification example of a circuit configuration in the pixel array section of FIG. 2.

FIG. 29 is a diagram illustrating a modification example of the circuit configuration in the pixel array section of FIG. 2.

FIG. 30 is a diagram illustrating an example of functional blocks of a distance measurement apparatus according to a second embodiment of the present disclosure.

FIG. 31 is a diagram illustrating an example of a schematic configuration of a photodetector of FIG. 30.

FIG. 32 is a block diagram depicting an example of schematic configuration of a vehicle control system.

FIG. 33 is a diagram of assistance in explaining an example of installation positions of an outside-vehicle information detecting section and an imaging section.

MODES FOR CARRYING OUT THE INVENTION

Hereinafter, embodiments of the present disclosure are described in detail with reference to the drawings. It is to be noted that the description is given in the following order.
1. First Embodiment (FIGS. 1 to 7): an imaging unit
2. Modification Examples (FIGS. 8 to 29)
3. Second Embodiment (FIGS. 30 and 31): a distance measurement apparatus
4. Application Example (FIGS. 32 and 33)

1. First Embodiment

[Configuration]

FIG. 1 illustrates an example of functional blocks of an imaging unit 100 according to a first embodiment of the present disclosure. For example, the imaging unit 100 is a unit that acquires image data by imaging, and includes an optical system 110, a solid-state imaging device 120, a controller 130, and a communicator 140, as illustrated in FIG. 1.

The optical system 110 condenses incident light and guides the condensed light to the solid-state imaging device 120. The solid-state imaging device 120 acquires image data by imaging, and outputs the image data obtained by imaging to the outside via the communicator 140. The solid-state imaging device 120 includes a plurality of pixels 10 to be described later. The plurality of pixels 10 is disposed two-dimensionally in an effective pixel region. The communicator 140 is an interface that communicates with an external apparatus, and outputs to the external apparatus the image data obtained by the solid-state imaging device 120.

The controller 130 controls the solid-state imaging device 120 to cause the solid-state imaging device 120 to acquire image data by imaging. For example, the controller 130 allows for simultaneous selection of a plurality of pixels 10 (a pixel row) disposed side by side in a row direction to thereby cause the solid-state imaging device 120 to hold a plurality of pieces of pixel data obtained in the selected pixel row. For example, the controller 130 further causes the plurality of pieces of pixel data having been held to be sequentially outputted to the communicator 140. For example, the controller 130 sequentially selects a plurality of pixel rows in a predetermined cycle and causes the plurality of pieces of pixel data obtained thereby to be sequentially outputted to the communicator 140. In such a manner, the controller 130 causes the plurality of pieces of pixel data obtained by the solid-state imaging device 120 to be outputted as image data from the solid-state imaging device 120 to the communicator 140, FIG. 2 illustrates an example of a schematic configuration of the solid-state imaging device 120. For example, the solid-state imaging device 120 includes a pixel array section 121, a row driver 122, an A/D converter 123, a digital count section 124, and an interface 125, as illustrated in FIG. 2.

The pixel array section 121 includes the plurality of pixels 10 that performs photoelectric conversion. The plurality of pixels 10 is disposed in a matrix form of s×m (s and m each being a positive integer) in the effective pixel region. In the pixel array section 121, two horizontal signal lines HSL1 and SHL2 are wired along the row direction for the respective pixel rows, and two vertical signal lines VSL1 and VSL2 are wired along a column direction for respective pixel columns. The horizontal signal lines HSL1 and SHL2 are each a wiring line adapted to control a timing of reading signals from the pixels 10. One end of each of the horizontal signal lines HSL1 and SHL2 is coupled to the row driver 122. The vertical signal lines VSL1 and VSL2 are each a wiring line adapted to read signals from the pixels 10. One end of the vertical signal line VSL1 is coupled to the A/D converter 123. One end of the vertical signal line VSL2 is coupled to the digital count section 124.

For example, each of the pixels 10 includes an optical pulse responder 11 and a detector 12, as illustrated in FIG. 3.

(Optical Pulse Responder 11)

The optical pulse responder 11 generates a pulse signal in response to light incidence. For example, the optical pulse responder 11 includes a light receiver 11b and a quench part 11a, as illustrated in FIG. 3.

The light receiver 11b includes an avalanche photodiode (APD). In a Geiger-mode APD, when a voltage equal to or higher than a breakdown voltage is applied between terminals, incidence of a single photon causes an avalanche phenomenon. The APD in which a single photon is multiplied by the avalanche phenomenon is referred to as a single photon avalanche diode (SPAD). In each of the pixels 10, for example, the light receiver 11b includes the SPAD. The quench part 11a has a function of stopping (quenching) the avalanche phenomenon by reducing a voltage applied to the light receiver 11b to the breakdown voltage. The quench part 11a further has a function of enabling detection of a photon again at the light receiver 11b by making the voltage applied to the light receiver 11b a bias voltage equal to or higher than the breakdown voltage. The quench part 11a includes a MOS transistor, for example. The quench part 11a may be a resistor, for example.

One end of the quench part 11a (for example, a source of the MOS transistor) is coupled to a power supply line to which a fixed voltage Vspad is to be applied. Meanwhile, another end of the quench part 11a (for example, a drain of the MOS transistor) is coupled to one end of the light receiver 11b (for example, a cathode of the SPAD). FIG. 3 illustrates an N1 as a coupling point (coupling node) between the quench part 11a and the light receiver 11b. Another end of the light receiver 11b (for example, an anode of the SPAD) is coupled to, for example, a power supply line to which a criterion voltage Van is to be applied. Values of the fixed voltage Vspad and the criterion voltage Van are set to allow a voltage equal to or higher than the breakdown voltage to be applied to the light receiver 11b. The coupling node N1 is coupled to an analog counter 12a (to be described later) of the detector 12.

(Detector 12)

For example, the detector 12 includes the analog counter 12a, an OVF (overflow) controller 12b, and switch parts 12c and 12d, as illustrated in FIG. 3. The detector 12 performs count processing on the basis of the pulse signal inputted from the optical pulse responder 11. The detector 12 outputs a digital count voltage Vout1 and an analog count voltage Vout2 obtained by the count processing. For example, the detector 12 outputs the count voltage Vout1 to the vertical signal line VSL1 and outputs the count voltage Vout2 to the vertical signal line VSL2. With a count value Cnt2 obtained on the basis of the count voltage Vout2 being set on a low-bit side and a count value Cnt1 obtained on the basis of the count voltage Vout1 being set on a high-bit side, the count value Cnt1 and the count value Cnt2 are combined to provide a count value Cnt. The count value Cnt becomes pixel data.

The analog counter 12a outputs an analog voltage (a count voltage Vcnt) corresponding to the number of pulses inputted from the optical pulse responder 11. For example, the analog counter 12a is a count-down counter in which the count voltage Vcnt reduces stepwise from an initial voltage every time the pulse signal is inputted from the optical pulse responder 11. The analog counter 12a may be, for example, a count-up counter in which the count voltage Vcnt increases stepwise from the initial voltage every time the pulse signal is inputted from the optical pulse responder 11. The count voltage Vcnt outputted from the analog counter 12a is inputted to the OVF controller 12b.

The analog counter 12a resets an output (the count voltage Vcnt) of the analog counter 12a on the basis of an inverted signal of a comparison voltage Vcmp inputted from the OVF controller 12b. The analog counter 12a resets the output of the analog counter 12a, thereby outputting the initial voltage as the count voltage Vcnt.

The OVF controller 12b detects presence or absence of saturation of the analog counter 12a and outputs a result thereof as a saturation voltage Vovf. The OVF controller 12b outputs the saturation voltage Vovf to the switch part 12c and outputs the inverted signal of the comparison voltage Vcmp to the analog counter 12a. When being on, the switch part 12c outputs the saturation voltage Vovf inputted to an input terminal, to the vertical signal line VSL1 via an output terminal. When being off, the switch part 12c makes the input terminal floating. In other words, the switch part 12c outputs, as the count voltage Vout1, only the saturation voltage Vovf when the switch part 12c is on, to the vertical signal line VSL1 When being on, the switch part 12d outputs the count voltage Vcnt inputted to an input terminal, to the vertical signal line VSL2 via, an output terminal. When being off, the switch part 12d makes the input terminal floating. In other words, the switch part 12d outputs, as the count voltage Vout2, only the count voltage Vcnt when the switch part 12d is on, to the vertical signal line VSL1.

Next, a detailed description is given of circuit configurations of the analog counter 12a and the OVF controller 12b. FIG. 4 illustrates an example of the circuit configurations of the analog counter 12a and the OVF controller 12b. FIG. 5 illustrates an example of a temporal change in signal waveforms in the detector 12.

(Analog Counter 12a)

For example, the analog counter 12a includes a charge extractor 12-1, a holder 12-2, and a resetter 12-3, as illustrated in FIG. 4.

The charge extractor 12-1 is a circuit that includes a capacitor C1 and accumulates in the capacitor C1 charge corresponding to a voltage of the pulse signal inputted from the optical pulse responder 11. A relationship of V=Q/C is established among capacitance C of the capacitor C1, accumulated charge Q, and a voltage V extracted from the capacitor C1 This enables the analog counter 12a to hold a voltage corresponding to the number of the inputted pulses.

The holder 12-2 is a circuit that includes a capacitor C2 and reduces the initial voltage held in the capacitor C2 by an amount of a voltage of the capacitor C1 held in the charge extractor 12-1. Every time the pulse signal is inputted from the optical pulse responder 11 to the charge extractor 12-1, a voltage (the count voltage Vcnt) of the capacitor C2 in the holder 12-2 reduces stepwise from the initial voltage.

The resetter 12-3 includes a switch element. When the inverted signal of the comparison voltage Vcmp is inputted from the OVF controller 12b as a signal for turning on the switch element, the resetter 12-3 turns on the switch element and sets the voltage (the count voltage Vcnt) of the capacitor C2 to the initial voltage (a power supply voltage Vdd). In other words, the resetter 12-3 resets the count voltage Vcnt when the inverted signal of the comparison voltage Vcmp is inputted from the OVF controller 12b as the signal for turning on the switch element. The resetter 12-3 turns off the switch element when the inverted signal of the comparison voltage Vcmp is inputted from the OVF controller 12b as a signal for turning off the switch element.

(OVF Controller 12b)

For example, the OVF controller 12b includes a comparator, an inverter, an RS flip-flop, and an AND circuit, as illustrated in FIG. 4. For example, the OVF controller 12b performs comparison between the count voltage Vcnt and a reference voltage Vref that are inputted to the comparator. Consequently, when the count voltage Vcnt falls below the reference voltage Vref (that is, when the count voltage Vcnt goes beyond the reference voltage Vref from a higher side to a lower side thereof), the OVF controller 12b outputs a Hi voltage as the comparison voltage Vcmp to the RS flip-flop and the inverter. The inverter outputs the inverted signal of the inputted comparison voltage Vcmp to the resetter 12-3. At this time, the OWE controller 12b causes resetting of the count voltage Vcnt. When the count voltage Vcnt exceeds the reference voltage Vref (that is, when the count voltage Vcnt goes beyond the reference voltage Vref from the lower side to the higher side), the OVF controller 12b outputs a Lo voltage as the comparison voltage Vcmp to the RS flip-flop and the inverter.

The RS flip-flop is used as a memory. In the RS flip-flop, an S terminal is coupled to an output terminal of the comparator, a Q terminal is coupled to an input terminal of the switch part 12c and one input terminal of the AND circuit, and an R terminal is coupled to an output terminal of the AND circuit. In the RS flip-flop, when S=0 (Lo)→1 (Hi)

is satisfied, Q=0 (Lo)→1 (Hi) is satisfied. At this time, the RS flip-flop is in an on state. Thereafter, even if S=1 (Hi)→0 (Lo) is satisfied, Q=1 (Hi) is maintained. In a case where R=0 (Lo)→1 (Hi) is satisfied while the RS flip-flop is in the on state, Q=1 (Hi)→0 (Lo) is satisfied. At this time, the RS flip-flop is in an off state.

In the AND circuit, the one input terminal is coupled to the Q terminal of the RS flip-flop, another input terminal is coupled to a wiring line that supplies a control signal Sel1 for turning on and off the switch part 12c, and the output terminal is coupled to the R terminal of the RS flip-flop.

When the comparison voltage Vcmp involving variation from the Lo voltage to the Hi voltage is inputted to the S terminal, the RS flip-flop outputs the Hi voltage as the saturation signal Vovf from the Q terminal. At this time, the count voltage Vcnt is reset in the resetter 12-3, and the comparison voltage Vcmp involving variation from the Hi voltage to the Lo voltage is inputted to the S terminal. However, because the RS flip-flop is the on state, the RS flip-flop continues to output the Hi voltage as the saturation signal Vovf from the Q terminal.

When the control signal Sel1 becomes a voltage (the Hi voltage) for turning on the switch part 12c, the saturation signal Vovf of the Hi voltage is outputted as the count voltage Vout1 to the vertical signal line VSL1. At this time, both of the input terminals of the AND circuit have the Hi voltage. Accordingly, the AND circuit inputs the Hi voltage to the R terminal. This results in the off state of the RS flip-flop, which outputs the Lo voltage as the saturation signal Vovf from the Q terminal. At this time, a voltage (the count voltage Vout1) of the vertical signal line VSL1 transitions from the Hi voltage to the Lo voltage. Thereafter, when the control signal Sel1 becomes a voltage (the Lo voltage) for turning off the switch part 12c, the switch part 12c is turned off, and the voltage at each of the output terminal of the AND circuit and the R terminal of the RS flip-flop transitions from the Hi voltage to the Lo voltage.

(Peripheral Circuit)

Next, a description is given of the peripheral circuit of the pixel array section 121 in the solid-state imaging device 120. The peripheral circuit includes the row driver 122, the A/D converter 123, the digital count section 124, and the interface 125.

The row driver 122 controls the timing of reading signals from the plurality of pixels 10. The row driver 122 outputs, to the plurality of horizontal signal lines HSL1 and HSL2, control signals for selecting the plurality of pixels 10 for the respective pixel rows. Accordingly, the signals from the plurality of pixels 10 are sequentially outputted to the plurality of vertical signal lines VSL for the respective pixel rows.

The A/D converter 123 is coupled to the vertical signal line VSL2. The vertical signal line VSL2 is coupled to an output end of the analog counter 12a via the switch part 12d. The A/D converter 123 performs A/D conversion on a voltage (the count voltage Vcnt) at the output end of the analog counter 12a via the vertical signal line VSL2, thereby generating a digital count value Cnt2 (n−k bits) corresponding to the count voltage Vcnt.

The digital count section 124 is coupled to the vertical signal line VSL1. The digital count section 124 reads a digital signal (the count voltage Vout1) via the vertical signal line VSL1 and performs count processing on the read count voltage Vout1, thereby generating a digital count value Cnt1 (k bits). The digital count section 124 includes a digital adder 124A and a memory array 124B, as illustrated in FIG. 3.

The digital adder 124A initializes the memory array 124B at a start of an exposure period. Thereafter, the digital adder 124A reads the count voltage Vout1 of a certain pixel 10 (hereinafter, referred to as a "pixel 10 to be subjected to count processing") via the vertical signal line VSL in a predetermined cycle. The digital adder 124A further reads, from the memory array 124B, the count voltage Vout1 of the pixel 10 to be subjected to count processing which has been previously written in the memory array 124B. The digital adder 124A adds both the read count voltages Vout1 to each other and writes (performs overwriting with) the thus obtained value into the memory array 124B, as the count voltage Vout1 of the pixel 10 to be subjected to count processing. The digital adder 124A repeatedly performs the above-described addition processing (count processing) every time the digital adder 124A reads the count voltage Vout1 from the pixel 10 to be subjected to count processing, thereby generating the digital count value Cnt1 (k bits).

The interface 125 combines the count value Cnt1 and the count value Cnt2, with the count value Cnt1 being set on the low-bit side and the count value Cnt2 being set on the high-bit side, thereby generating the count value Cnt (see FIG. 6). The interface 125 outputs, as pixel data, the generated count value Cnt to the outside.

Next, a description is given of an operation of reading a signal from the pixel array section 121. FIG. 7 is a conceptual diagram of an example of an operation of reading a signal from the pixel array section 121.

For example, the controller 130 controls the pixel array section 121 to allow for simultaneous turning on of the respective switches 12c of the plurality of (in) pixels 10 (a row line) disposed side by side in the row direction. Accordingly, a signal processor 122 reads the count voltage Vout1 from each of the pixels 10 in the row line having been selected by the controller 130 and performs count processing on the read count voltage Vout1, thereby generating the digital count value Cnt1.

Here, the count voltage Vout1 is 1-bit digital data taking a value of "1" or "0". For example, assume that 3 bits are assigned as the count value Cn. At this time, the signal processor 122 adds the digital count voltage Vout1 to the count value Cnt1. In a case where the count value Cnt1 is a default value (000), the signal processor 122 adds the read count voltage Vout ("1" or "0") to the count value Cnt1 to make the count value Cnt1 001 or 000.

For example, the controller 130 performs the above-described control on all of (s) row lines for each row line. Accordingly, the signal processor 122 reads a plurality of (in) count voltages Vout1 from each of the row lines and performs count processing on the read count voltages Vout1, thereby generating the digital count values Cnt1. The count values Cnt1 for one frame are thus obtainable. The signal processor 122 holds in a memory the acquired count values Cnt1 for one frame.

For example, the controller 130 repeatedly acquires the count values Cnt1 for one frame as described above during the exposure period. The controller 130 acquires the count values Cnt2 for one frame simultaneously with acquiring the count values Cnt1 for one frame as described above at a timing when the exposure period ends.

For example, the controller 130 controls the pixel array section 121 to allow for simultaneous turning on of the respective switches 12d included in the row line at the timing when the exposure period ends. Accordingly, the signal processor 122 reads the analog count voltage Vout2 from each of the pixels 10 in the row line having been selected by the controller 130 and performs AD conversion on the read count voltage Vout2, thereby generating the digital count value Cnt2 corresponding to the count voltage Vout2. Here, for example, assume that 4 bits are assigned as the count value Cnt2. At this time, the count value Cnt2 is 0101, for example.

For example, the controller 130 performs the above-described control on all of the (s) row lines for each row line. Accordingly, the signal processor 122 reads a plurality of (n) count voltages Vout2 from each of the row lines and performs the AD conversion on the read count voltages Vout2, thereby generating the digital count values Cnt2 corresponding to the count voltages Vout2. The count values Cnt2 for one frame are thus obtainable. The signal processor 122 holds in a memory the acquired count values Cnt2 for one frame.

The signal processor 122 generates pixel data for one frame (that is, image data) by using the count values Cnt1 for one frame having been read from one of the memories and the count values Cnt2 for one frame having been read from another of the memories.

Effects

Next, a description is given of effects of the imaging unit 100.

In the present embodiment, the OVF controller 12b is provided in a subsequent stage of the analog counter 12a. The OVF controller 12b resets the count voltage Vcnt of the analog counter 12a when the count value cnt1 of the analog counter 12a exceeds a predetermined threshold. It is thus possible, for example, to count lower bits by the analog counter 12a and count higher bits by a digital counter 122a. Consequently, this makes it possible to reduce the number of times of reading an analog value per pixel 10 to one and also to increase the number of bits by the number of provided digital counters 122a. It is therefore possible to reduce limitation on a frame rate while using an analog counter.

In the present embodiment, the digital count value Cnt1 is generated by performing count processing on a digital signal (the count voltage Vout1) outputted from the OVF controller 12b. Further, the digital count value Cnt2 is generated by performing A/D conversion on the analog count voltage Vout2 outputted from the analog counter 12a. It is thus possible, for example, to count lower bits by the analog counter 12a and count higher bits by the digital counter 122a. Consequently, this makes it possible to reduce the number of times of reading an analog value per pixel 10 to one and also to increase the number of bits by the number of provided digital counters 122a. It is therefore possible to reduce limitation on a frame rate while using an analog counter.

In the present embodiment, the pixel array section 121 is provided with the vertical signal line VSL1 that transmits the digital count voltage Vout1 to the digital adder 124A and the vertical signal line VSL2 that transmits the analog count voltage Vout2 to the A/D converter 123. This makes it possible to provide the digital adder 124A and the A/D converter 123 outside the pixel array section 121 and therefore to reduce a size of the pixel 10.

2. Modification Examples

Next, a description is given of modification examples of the imaging unit 100 according to the above-described embodiment.

Modification Example A

In the above-described embodiment, for example, a digital counter array 124C may be provided in place of the digital adder 124A and the memory array 124B, as illustrated in FIG. 8.

The digital counter array 124C includes a digital counter corresponding to each of the pixels 10. The digital counter array 124C initializes the digital counter array 124C at a start of an exposure period. Thereafter, the digital counter array 124C reads the count voltage Vout1 (a digital count value) of the pixel 10 to be subjected to count processing via the vertical signal line VSL1 in a predetermined cycle and performs count processing on the read count voltage Vout1, thereby generating the digital count value Cnt1 (k bits). The digital counter array 124C repeatedly performs the above-described count processing every time the digital counter array 124C reads the count voltage Vout1 (digital count value) from the pixel 10 to be subjected to count processing, thereby generating the digital count value Cnt1 (k bits). In a case where the digital counter array 124C is provided, an area occupied by the digital count section 124 slightly increases as compared with the above-described embodiment. However, it is possible to achieve similar effects to those of the above-described embodiment in any other points.

Modification Example B

In the above-described embodiment, for example, the OVF controller 12b may include a digital counter in place of the RSFF and the AND circuit, as illustrated in FIG. 9. At this time, this digital counter is a 1-bit digital counter. For example, every time the comparison voltage Vcmp becomes the Hi voltage, an output (the saturation voltage Vovf) of the digital counter varies to take "1", "0", "1", and so on, as illustrated in FIG. 10. In such a case as well, it is possible to obtain the count values Cnt1 and Cnt2 similar to those of the above-described embodiment. It is therefore possible to reduce limitation on a frame rate while using an analog counter in a similar manner to the above-described embodiment.

Modification Example C

In the above-described embodiment, for example, the OVF controller 12b may include an inverter in place of the comparator, as illustrated in FIG. 11. At this time, when the count voltage Vcnt having a value lower than a threshold of the inverter is inputted to the inverter, the inverter outputs, as an output signal Vinv, the Hi voltage to the RS flip-flop and the inverter. Further, when the count voltage Vcnt having a value higher than the threshold of the inverter is inputted to the inverter, the inverter outputs, as the output signal Vinv, the Lo voltage to the RS flip-flop and the inverter. In such a case as well, it is possible to achieve similar functions to those of the above-described embodiment. It is therefore possible to reduce limitation on a frame rate while using an analog counter in a similar manner to the above-described embodiment.

Modification Example D

In the above-described embodiment, for example, an A/D converter 122b may include a comparator and a counter, as illustrated in FIG. 12. At this time, a voltage (the count voltage Vout2) of the vertical signal line VSL2 and a reference voltage Vref_adc is inputted to the comparator The comparator performs comparison between the count voltage Vout2 and the reference voltage Vref_adc. When the count voltage Vout2 falls below the reference voltage Vref_adc, the comparator outputs a high-level voltage. For example, when the count voltage Vout2 exceeds the reference voltage Vref_adc, the comparator outputs a low-level voltage. The counter counts the number of pulses inputted from the comparator, thereby generating the count value Cnt2 (n–k bits).

Modification Example E

In the above-described embodiment, for example, an A/D converter 124c may include a comparator and a latch, as illustrated in FIG. 13. At this time, a voltage (the count voltage Vout2) of the vertical signal line VSL2 and the reference voltage Vref_adc is inputted to the comparator. The comparator performs comparison between the count voltage Vout2 and the reference voltage Vref_adc. When the count voltage Vout2 falls below the reference voltage Vref_adc, the comparator outputs a high-level voltage. For example, when the count voltage Vout2 exceeds the reference voltage Vref_adc, the comparator outputs a low-level voltage. The latch records (holds) a time code at the time when an output of the comparator becomes a high level.

Modification Example F

In the above-described embodiment and the modification examples thereof, the capacitors C1 and C2 of the analog counter 12a may each include MIM (Metal-Insulator-Metal). At this time, for example, the capacitors C1 and C2 may be formed on a chip (a sensor chip 100A) different from a logic chip 100B on which the signal processor 122 and the interface 123 are formed, as illustrated in FIG. 14. The sensor chip 100A is formed with the pixel array section 121. For example, the sensor chip 100A and the logic chip 100B are stacked by bonding a Cu pad formed on the sensor chip 100A and a Cu pad formed on the logic chip 1001B to each other.

It is to be noted that, for example, the capacitors C1 and C2 may be formed on the logic chip 100B, as illustrated in FIG. 15. At this time, a portion of each of the pixels 10 excluding the capacitors C1 and C2 may be formed on the sensor chip 100A. This makes it possible to reduce a size of the sensor chip 100A because the capacitors C1 and C2 taking an area are not to be formed on the sensor chip 100A.

FIG. 16 illustrates an example of a planar configuration of the capacitors C1 and C2. For example, the capacitors C1 and C2 each have a comb tooth shape as illustrated in FIG. 16. In such a case, it is possible to form the capacitors C1 and C2 in the same layer with capacitance being not so different from that in a case where the capacitors C1 and C2 are stacked in a thickness direction.

Modification Example G

In the above-described embodiment and the modification examples thereof, for example, each of the pixels 10 may include a switcher 13, as illustrated in FIG. 17. The switcher 13 performs switching between an output of the saturation signal Vovf to the vertical signal line VSL and an output of the count voltage Vcnt to the vertical signal line VSL. At this time, for example, the peripheral circuit may include a switcher 126, as illustrated in FIG. 17. The switcher 126 couples the vertical signal line VSL to the digital adder 124A when the saturation signal Vovf is applied to the vertical signal line VSL, and couples the vertical signal line VSL to the A/D converter 123 when the count voltage Vcnt is applied to the vertical signal line VSL. In such a case, it is possible to reduce the number of the vertical signal lines VSL and therefore to reduce an area of the pixel array section 121.

Modification Example H

In the above-described embodiment and the modification examples thereof, for example, the A/D converter 123 may be eliminated, as illustrated in FIG. 18. At this time, an A/D converter 12e having a similar function to that of the A/D converter 123 may be provided in the detector 12 of each of the pixels 10, and a reader 127 that reads a voltage of the vertical signal line VSL2 may be provided in the peripheral circuit. In such a case, it is possible to output two digital signals (the saturation signal Vovf and the count voltage Vcnt) from each of the pixels 10 to the vertical signal lines VSL1 and VSL2, thus making it possible to achieve the imaging unit 100 resistant to external noise.

Modification Example I

In the above-described embodiment and the modification examples thereof, for example, the detector 12 may include a plurality of stages each including a set of the analog counter 12a and the OVF controller 12b as an analog block, as illustrated in FIG. 19.

At this time, in the analog block in a first stage, the analog counter 12a generates an analog count value Cnt1 (the count voltage Vcnt1). Further, in the analog block in the first stage, when the count voltage Vcnt1 generated by the analog counter 12a falls below the reference voltage Vref (that is, when the count voltage Vcnt1 goes beyond the reference voltage Vref from the higher side to the lower side), the OVF controller 12b outputs the Hi voltage as the saturation signal Vovf. For example, when the count voltage Vcnt1 exceeds the reference voltage Vref (that is, when the count voltage Vcnt1 goes beyond the reference voltage Vref from the higher side to the lower side), the OVF controller 12b outputs the Lo voltage as the saturation signal Vovf.

In the analog block in or after a second stage, the analog counter 12a performs count processing on the basis of the saturation signal Vovf outputted from the OVF controller 12b in the analog block in a preceding stage, thereby generating an analog count value Cnt2 (count voltage Vcnt2). Further, in the analog block in or after the second stage, when the count voltage Vcnt2 generated by the analog counter 12a falls below the reference voltage Vref (that is, when the count voltage Vcnt2 goes beyond the reference voltage Vref from the higher side to the lower side), the OVF controller 12b outputs the Hi voltage as the saturation signal Vovf. For example, when the count voltage Vcnt2 exceeds the reference voltage Vref (that is, when the count voltage Vcnt2 goes beyond the reference voltage Vref from the higher side to the lower side), the OVF controller 12b outputs the Lo voltage as the saturation signal Vovf.

In the present modification example, the peripheral circuit includes the digital count section 124, the A/D converter 123, and an A/D converter 128. The digital adder 124A is coupled to the vertical signal line VSL1, The vertical signal line VSL1 is coupled to the OVF controller 12b in the second stage via the switch part 12c. The digital adder 124A reads the saturation signal Vovf of the second stage via the vertical signal line VSL1 and performs count processing on the read saturation signal Vovf, thereby generating the digital count value Cnt1 (k1 bits).

The A/D converter 123 is coupled to the vertical signal line VSL2. The vertical signal line VSL2 is coupled to an output end of the analog counter 12a in the first stage via the switch part 12d. The A/D converter 123 performs A/D conversion on a voltage (the count voltage Vcnt2) at the output end of the analog counter 12a in the first stage via the vertical signal line VSL2, thereby generating the digital count value Cnt2 (k2 bits) corresponding to the count voltage Vcnt2.

The A/D converter 128 is coupled to a vertical signal line VSL3. The vertical signal line VSL3 is coupled to an output end of the analog counter 12a in the second stage via a switch part 12f. The A/D converter 128 performs A/D conversion on a voltage (a count voltage Vcnt3) at the output end of the analog counter 12a in the second stage via the vertical signal line VSL3, thereby generating a digital count value Cnt3 (n-k1-k2 bits) corresponding to the count voltage Vcnt3.

The interface 125 combines the count values Cnt1, Cnt2, and Cnt3, with the count values (count values Cnt2 and Cnt3) obtained from the analog counters 12a in the first stage and the second stage being set on the low-bit side and with the count value (count Cnt1) obtained from the digital counter 122a being set on the high-bit side, thereby generating the count value Cnt (see FIG. 20). It is to be noted that the count value Cnt2 is set closer to the low-bit side than the count value Cnt3. The interface 125 outputs, as pixel data, the generated count value Cnt to the outside.

As described above, it is possible to handle a larger number of bits by providing the plurality of stages each including a pair of the analog counters 12a and the OVF controller 12b as the analog block. It is therefore possible to reduce limitation on a frame rate while using an analog counter.

Modification Example J

In the above-described embodiment and the modification examples thereof, for example, the detector 12 may include a digital counter 12g in a subsequent stage of the OVF controller 12b, as illustrated in FIG. 21. At this time, the digital count section 124 may be eliminated, and a reader 129 that reads a voltage of the vertical signal line VSL1 may be provided in the peripheral circuit.

The digital counter 12g performs count processing on a digital signal outputted from the OVF controller 12b, thereby generating the digital count value Cnt1. A reader 122f reads the digital count value Cnt1 via the vertical signal line VSL1.

FIG. 22 illustrates an example of a temporal change in the count value Cnt obtained from the pixel 10. At a low illuminance, the analog counter 12a may not be saturated and counting may not be performed by the digital counter 12g. At a medium illuminance and a high illuminance, saturation of the analog counter 12a also causes counting to be performed by the digital counter 12g. The temporal change in the count value Cnt is gradual at a low illuminance, whereas the temporal change in the count value Cnt becomes steep as the illuminance increases.

Modification Example K

In Modification Example J described above, for example, the detector 12 may include a determiner 12h, as illustrated in FIG. 23. The determiner 12h sets the reference voltage Vref on the basis of the count value Cnt1 generated by the digital counter 12g. For example, the determiner 12h generates a control signal Scode for setting the reference voltage Vref on the basis of the count value Cnt1 and outputs the generated control signal Scode to the OVF controller 12b.

In the OVF controller 12b, for example, a plurality of reference voltage lines is coupled to one input terminal of the comparator via a switcher, as illustrated in (A) of FIG. 24. The switcher selects one reference voltage line out of the plurality of reference voltage lines on the basis of the control signal Scode inputted from the determiner 12h.

In the OVF controller 12b, for example, a plurality of constant current sources may be coupled to the one input terminal of the comparator via the switcher, as illustrated in (B) of FIG. 24. At this time, the switcher selects one reference voltage line out of the plurality of reference voltage lines on the basis of the control signal Scode inputted from the determiner 12h.

FIG. 25 illustrates an example of the temporal change in the count value Cnt obtained from the pixel 10. A plurality of thresholds is set for the count value Cnt, as indicated by a broken line in FIG. 25. At a low illuminance, the count value Cnt does not reach a threshold of the lowest value, which causes selection of a reference voltage line to which a reference voltage Vref1 of the lowest value is to be applied. At a medium illuminance and a high illuminance, the count value Cnt reaches the threshold of the lowest value, which causes selection of a reference voltage line to which a reference voltage Vref2 higher than the reference voltage line Vref1 of the lowest value is to be applied. At this time, the count value Cnt further reaches the second lowest threshold, which causes selection of a reference voltage line to which a reference voltage Vref3 higher than the reference voltage Vref2 is to be applied.

As described above, it is possible to set the temporal change in the count value Cnt substantially constant regardless of the illuminance by setting the value of the reference voltage depending on a magnitude of the count value Cnt.

Modification Example L

In the above-described embodiment and the modification examples thereof, for example, the solid-state imaging device 120 may be formed on one semiconductor substrate 100C, as illustrated in FIG. 26. At this time, an effective pixel region in which the plurality of pixels 10 is disposed in a matrix form is formed on a surface of the semiconductor substrate 100C. For example, the row driver 122, the A/D converter 123, the digital count section 124, the interface 125, or the like is mounted around the effective pixel region on the surface of the semiconductor substrate 100C.

Modification Example M

In the above-described embodiment and the modification example thereof, for example, the solid-state imaging device 120 may be configured by stacking a plurality of semiconductor substrates (for example, two semiconductor substrates 100D and 100E), as illustrated in FIG. 27. At this time, a plurality of light receivers 11b may be disposed in a matrix form on a surface of the semiconductor substrate 100D, and a plurality of quench parts 11a may be disposed in a matrix form on a surface of the semiconductor substrate 100E. For example, the semiconductor substrates 100D and 100E are bonded to each other by bonding a pad part 11c including Cu and provided on a side of the semiconductor substrate 100D and a pad part 11d including Cu and provided on a side of the semiconductor substrate 100E to each other. In such a case, it is possible to form the solid-state imaging device 120 as a stack in which the light receiver 11b and the quench part 11a are stacked on each other in each of the pixels 10. This makes it possible to reduce a planar size of the pixel 10 as compared with a case where the light receiver 11b and the quench part 11a are formed on a surface of one semiconductor substrate.

Modification Example N

In the above-described embodiment and the modification examples thereof, for example, an adder 20 may be coupled to outputs of the plurality of pixels 10, as illustrated in FIG. 28. The adder 20 adds the count values Cnt inputted from the plurality of pixels 10. This makes it possible to obtain an image with high sensitivity.

Modification Example O

In the above-described embodiment and the modification examples thereof, for example, the detector 12 may be eliminated in each of the pixels 10, as illustrated in FIG. 29. At this time, the adder 20 may be coupled to outputs of a plurality of optical pulse responders 11, and the detector 12 may be coupled to an output of the adder 20. The adder 20 counts the number of pulses inputted from the plurality of optical pulse responders 11, and outputs analog count values obtained thereby to the detector 12. In such a case as well, it is possible to obtain an image with high sensitivity.

3. Second Embodiment

[Configuration]

FIG. 30 illustrates an example of functional blocks of a distance measurement apparatus 200 according to a second embodiment of the present disclosure. The distance measurement apparatus 200 is a ToF (Time Of Flight) sensor, and emits light and detects reflected light reflected by a detection target. The distance measurement apparatus 200 includes a light emitter 210, an optical system 220, a photodetector 230, a controller 240, a signal processor 250, and a communicator 260.

The light emitter 210 emits a light pulse L0 toward the detection target on the basis of instructions from the controller 240. The light emitter 210 emits the light pulse L0 by performing, on the basis of instructions from the controller 240, light emitting operation where light emission and non-light emission are alternately repeated. The light emitter 210 includes a light source that emits infrared light, for example. The light source includes a laser light source or an LED (Light Emitting Diode), for example.

The optical system 220 includes a lens that forms an image on a light receiving surface of the photodetector 230. A light pulse (a reflected light pulse L1) emitted from the light emitter 210 and reflected by the detection target enters the optical system 220.

The photodetector 230 detects the reflected light pulse L1 on the basis of instructions from the controller 240. The signal processor 250 generates distance image data on the basis of a result of detection by the photodetector 230, and outputs the generated distance image data to the outside via the communicator 250. For example, the photodetector 230 has a similar configuration to that of the solid-state imaging device 120 according to the above-described embodiment or any of the modification examples thereof, as illustrated in FIG. 31.

The controller 240 supplies control signals to the light emitter 210 and the photodetector 230, and controls operation of the light emitter 210 and the photodetector 230 to thereby control operation of the distance measuring apparatus 200.

Effects

In the present embodiment, similarly to the above-described embodiment, the OVF controller 12b is provided in a subsequent stage of the analog counter 12a. The OVF controller 12b resets the count voltage Vcnt of the analog counter 12a when the count value cnt1 of the analog counter 12a exceeds a predetermined threshold. It is thus possible, for example, to count lower bits by the analog counter 12a and count higher bits by a digital counter 124b. Consequently, this makes it possible to reduce the number of times of reading an analog value per pixel 10 to one and also to increase the number of bits by the number of provided digital counters 124b. It is therefore possible to reduce limitation on a frame rate while using an analog counter.

In the present embodiment, the digital count value Cnt1 is generated by performing count processing on a digital signal (the count voltage Vout1) outputted from the OVF controller 12b. Further, the digital count value Cnt2 is generated by performing A/D conversion on the analog count voltage Vout2 outputted from the analog counter 12a. It is thus possible, for example, to count lower bits by the analog counter 12a and count higher bits by the digital counter 124b. Consequently, this makes it possible to reduce the number of times of reading an analog value per pixel 10 to one and also to increase the number of bits by the number of provided digital counters 124b. It is therefore possible to reduce limitation on a frame rate while using an analog counter.

In the present embodiment, the pixel array section 121 is provided with the vertical signal line VSL1 that transmits the digital count voltage Vout1 to the digital adder 124A and the vertical signal line VSL2 that transmits the analog count voltage Vout2 to the A/D converter 123. This makes it possible to provide the digital adder 124A and the A/D converter 123 outside the pixel array section 121 and therefore to reduce the size of the pixel 10.

4. Application Example

The technology according to the present disclosure is applicable to a variety of products. For example, the technology according to the present disclosure may be implemented as a device to be mounted on any type of mobile body such as a vehicle, an electric vehicle, a hybrid electric vehicle, a motorcycle, a bicycle, a personal mobility, an airplane, a drone, a vessel, a robot, a construction machine, or an agricultural machine (tractor).

FIG. 32 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 32, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (O/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 32 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication U/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

FIG. 33 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 33 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 32, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (EEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHIS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automated driving, which makes the vehicle to travel automatedly without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 32, an audio speaker 7710, a display section 7720, and an instrument panel 7730 are illustrated as the output device. The display section 7720 may, for example, include at least one of an on-board display and ahead-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 32 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

It is to be noted that it is possible to mount a computer program for implementing each function of the imaging unit 100 described using FIGS. 1 to 29 and the like or each function of the distance measurement apparatus 200 described using FIGS. 30, 31, and the like on any control unit or the like. In addition, it is also possible to provide a computer-readable recording medium in which such a computer program is stored. The recording medium is, for example, a magnetic disk, an optical disk, a magneto-optical disk, a flash memory, or the like. In addition, the computer program described above may be distributed through a network, for example, without using a recording medium.

In the vehicle control system 7000 described above, it is possible to use the imaging unit 100 described using FIGS. 1 to 29 and the like or the distance measurement apparatus 200 described using FIGS. 30, 31, and the like as alight source steering section of LIDAR as an environment sensor, for example. In addition, it is also possible for an optical computing unit that includes the imaging unit 100 described using FIGS. 1 to 29 and the like or the distance measurement apparatus 200 described using FIGS. 30, 31, and the like to perform image recognition at the imaging section. In a case where the imaging unit 100 described using FIGS. 1 to 29 and the like or the distance measurement apparatus 200 described using FIGS. 30, 31, and the like is used as a highly efficient high-luminance projection device, it is possible to project lines or characters on the ground. Specifically, it is possible to display a line to enable people outside a vehicle to see where the vehicle is to pass when the vehicle moves backward, or to display crosswalks with light when the vehicle gives way to pedestrians.

Moreover, at least some components of the imaging unit 100 described using FIGS. 1 to 29 and the like may be implemented in a module (for example, an integrated circuit module including one die) for the integrated control unit 7600 illustrated in FIG. 32. Alternatively, the imaging unit 100 described using FIGS. 1 to 29 and the like may be implemented by the plurality of control units of the vehicle control system 7000 illustrated in FIG. 32.

Moreover, at least some components of the distance measurement apparatus 200 described using FIGS. 30, 31, and the like may be implemented in a module (for example, an integrated circuit module including one die) for the integrated control unit 7600 illustrated in FIG. 32. Alternatively, the distance measurement apparatus 200 described using FIGS. 30, 31, and the like may be implemented by the plurality of control units of the vehicle control system 7000 illustrated in FIG. 32.

Although the present disclosure has been described hereinabove with reference to the embodiments, the modification examples thereof, and the application examples thereof, the present disclosure is not limited to the foregoing embodiments and the like, and may be modified in a variety of ways. It is to be noted that the effects described herein are mere examples. The effects of the present disclosure are not limited to the effects described herein. The present disclosure may have effects other than the effects described herein.

In addition, for example, the present disclosure may have the following configurations.

(1)
A photodetection device including:
a pulse responder that generates a pulse signal in response to light incidence;
an analog counter part that generates an analog first count value by performing count processing on the basis of the pulse signal; and
a resetter that resets the first count value when the first count value exceeds a first threshold.

(2)
The photodetection device according to (1), in which
the resetter outputs, when the first count value exceeds the first threshold, a digital signal indicating that the first count value exceeds the first threshold, and
the photodetection device further includes:
a first digital counter that generates a digital second count value by performing count processing on the digital signal outputted from the resetter; and
an A/D converter that generates a digital third count value by performing A/D conversion on the first count value.

(3)
The photodetection device according to claim (1) or (2), further including switches at which an output of the digital signal to the first digital counter and an output of the first count value to the A/D converter are controlled by separate control signals.

(4)
The photodetection device according to (3), in which the resetter holds the digital signal when the first count value exceeds the first threshold, and resets the first count value when the resetter outputs the digital signal.

(5)
The photodetection device according to (3), in which the resetter includes a second digital counter that holds and outputs the digital signal.

(6)
The photodetection device according to (2), in which
the first digital counter includes a digital adder and a memory, and
the digital adder adds the digital signal outputted from the resetter and a count value read from the memory to each other, and overwrites the count value in the memory with a resultant value as the second count value.

(7)
The photodetection device according to any one of (1) to (6), in which the pulse responder includes an avalanche photodiode and a quench circuit coupled in series to the avalanche photodiode.

(8)
The photodetection device according to (2), further including an outputter that generates a fourth count value by combining the third count value and the second count value, with the third count value being set on a low-bit side and the second count value being set on a high-bit side, and outputs the generated fourth count value.

(9)
The photodetection device according to any one of (2) to (8), including
a plurality of stages each including a pair of the analog counter part and the resetter as an analog block,
in the analog block in a first stage, the resetter outputs, when the first count value generated by the analog counter part exceeds the first threshold, a digital signal indicating that the first count value exceeds the first threshold, in the analog block in or after a second stage, the analog counter part generates an analog fifth count value by performing count processing on the basis of the digital signal outputted from the resetter in the analog block in a preceding stage, and the resetter outputs, when the fifth count value inputted to the resetter exceeds a second threshold, a digital signal indicating that the fifth count value exceeds the second threshold.

(10)

The photodetection device according to any one of (2) to (8), further including a threshold setter that sets the first threshold on the basis of the second count value generated by the digital counter.

(11)

An imaging unit including:
a plurality of pixels disposed in a matrix form; and
a signal processor that generates image data on the basis of pixel data obtained from each of the pixels, in which
each of the pixels includes
  a pulse responder that generates a pulse signal in response to light incidence,
  an analog counter part that generates an analog first count value by performing count processing on the basis of the pulse signal, and
  a resetter that resets the first count value when the first count value exceeds a first threshold.

(12)

The imaging unit according to (11), in which
the resetter outputs, when the first count value exceeds the first threshold, a digital signal indicating that the first count value exceeds the first threshold, and
the signal processor includes
  a digital counter that generates a digital second count value by performing count processing on the digital signal outputted from the resetter, and
  an A/D converter that generates a digital third count value by performing A/D conversion on the first count value.

(13)

The imaging unit according to (11), further including switches at which an output of the digital signal to the first digital counter and an output of the first count value to the A/D converter are controlled by separate control signals.

(14)

The imaging unit according to (13), in which the resetter holds the digital signal when the first count value exceeds the first threshold, and resets the first count value when the resetter outputs the digital signal.

(15)

The imaging unit according to (13), in which the resetter includes a second digital counter that holds and outputs the digital signal.

(16)

The imaging unit according to any one of (11) to (15), further including:
a first wiring line that transmits the digital signal to the digital counter; and
a second wiring line that transmits the first count value to the A/D converter.

(17)

The imaging unit according to any one of (11) to (16), in which each of the pixels further includes a first switcher that performs switching between an output of the digital signal and an output of the first count value, and
the imaging unit further includes a second switcher that inputs an output of the switcher to the digital counter or the A/D converter.

(18)

The imaging unit according to any one of (11) to (17), in which
each of the pixels includes a plurality of stages each including a pair of the analog counter part and the resetter as an analog block,
in the analog block in a first stage, the resetter outputs, when the first count value generated by the analog counter part exceeds the first threshold, a digital signal indicating that the first count value exceeds the first threshold,
in the analog block in or after a second stage, the analog counter part generates an analog fifth count value by performing count processing on the basis of the digital signal outputted from the resetter in the analog block in a preceding stage, and
the resetter outputs, when the fifth count value inputted to the resetter exceeds a second threshold, a digital signal indicating that the fifth count value exceeds the second threshold.

(19)

The imaging unit according to (11), in which
the resetter outputs, when the first count value exceeds the first threshold, a digital signal indicating that the first count value exceeds the first threshold, and
each of the pixels further includes a digital counter that generates a digital second count value by performing count processing on the digital signal outputted from the resetter.

(20)

The photodetection device according to (19), further including a threshold setter that sets the first threshold on the basis of the second count value generated by the digital counter.

(21)

The photodetection device according to any one of (11) to (20), in which the pulse responder includes an avalanche photodiode and a quench circuit coupled in series to the avalanche photodiode.

(22)

The imaging unit according to any one of (11) to (21), in which a capacitor of the analog counter part includes MIM (Metal-Insulator-Metal).

(23)

The imaging unit according to (22), including:
a first chip formed with the capacitor of the analog counter, the capacitor including the MIM; and
a second chip formed with the pulse responder and a circuit of the analog counter excluding the MIM.

(24)

A distance measurement apparatus including:
a photodetection device; and
a signal processing circuit that calculates, from an output signal of the photodetection device, a distance to a measurement target, in which
the photodetection device includes
  a pulse responder that generates a pulse signal in response to light incidence,
  an analog counter part that generates an analog first count value by performing count processing on the basis of the pulse signal, and a resetter that resets the first count value when the first count value exceeds a first threshold.

In the photodetection device according to a first embodiment of the present disclosure, the imaging unit according to a second embodiment of the present disclosure, and the distance measurement apparatus according to a third embodiment of the present disclosure, the count value of the analog counter part is reset in a subsequent stage of the analog counter part when the count value of the analog counter part exceeds a predetermined threshold. It is thus possible, for example, to count lower bits by the analog counter part and count higher bits by another counter (for example, a digital counter). As described above, use of a multi-stage counter makes it possible to reduce limitation caused by an analog counter on a frame rate while using the analog counter.

This application claims the benefit of Japanese Priority Patent Application JP2021-189721 filed with the Japan Patent Office on Nov. 22, 2021, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A photodetection device comprising:
a pulse responder that generates a pulse signal in response to light incidence;
an analog counter that generates an analog first count value by performing count processing on a basis of the pulse signal;
a resetter that resets a first count value when the first count value exceeds a first threshold, wherein the resetter outputs, when the first count value exceeds the first threshold, a digital signal indicating that the first count value exceeds the first threshold;
a first digital counter that generates a digital second count value by performing count processing on the digital signal outputted from the resetter;
an A/D converter that generates a digital third count value by performing A/D conversion on the first count value; and
switches at which an output of the digital signal to the first digital counter and an output of the first count value to the A/D converter are controlled by separate control signals.

2. The photodetection device according to claim 1, wherein the resetter holds the digital signal when the first count value exceeds the first threshold, and resets the first count value when the resetter outputs the digital signal.

3. The photodetection device according to claim 1, wherein the resetter includes a second digital counter that holds and outputs the digital signal.

4. The photodetection device according to claim 1, wherein
the first digital counter includes a digital adder and a memory, and
the digital adder adds the digital signal outputted from the resetter and a count value read from the memory to each other, and overwrites the count value in the memory with a resultant value as a second count value.

5. The photodetection device according to claim 1, wherein the pulse responder includes an avalanche photodiode and a quench circuit coupled in series to the avalanche photodiode.

6. A distance measurement apparatus comprising a photodetection device according to claim 1.

7. An imaging unit comprising:
a plurality of pixels disposed in a matrix form;
a signal processor that generates image data on a basis of pixel data obtained from each of the pixels,
wherein each of the pixels includes
a pulse responder that generates a pulse signal in response to light incidence,
an analog counter that generates an analog first count value by performing count processing on a basis of the pulse signal, and
a resetter that resets a first count value when the first count value exceeds a first threshold, wherein the resetter outputs, when the first count value exceeds the first threshold, a digital signal indicating that the first count value exceeds the first threshold;
wherein the signal processor includes
a first digital counter that generates a digital second count value by performing count processing on the digital signal outputted from the resetter, and
an A/D converter that generates a digital third count value by performing A/D conversion on the first count value; and
switches at which an output of the digital signal to the first digital counter and an output of the first count value to the A/D converter are controlled by separate control signals.

8. The imaging unit according to claim 7, wherein the resetter holds the digital signal when the first count value exceeds the first threshold, and resets the first count value when the resetter outputs the digital signal.

9. The imaging unit according to claim 7, wherein the resetter includes a second digital counter that holds and outputs the digital signal.

10. The imaging unit according to claim 7, further comprising:
a first wiring line that transmits the digital signal to the first digital counter; and
a second wiring line that transmits the first count value to the A/D converter.

11. The imaging unit according to claim 7, wherein
each of the pixels includes a plurality of stages each including a pair of the analog counter and the resetter as an analog block,
in the analog block in a first stage, the resetter outputs, when the first count value generated by the analog counter exceeds the first threshold, a digital signal indicating that the first count value exceeds the first threshold,
in the analog block in or after a second stage, the analog counter generates an analog fifth count value by performing count processing on a basis of the digital signal outputted from the resetter in the analog block in a preceding stage, and
the resetter outputs, when the analog fifth count value inputted to the resetter exceeds a second threshold, a digital signal indicating that the analog fifth count value exceeds the second threshold.

12. The imaging unit according to claim 7, wherein
the resetter outputs, when the first count value exceeds the first threshold, a digital signal indicating that the first count value exceeds the first threshold, and
each of the pixels further includes a digital counter that generates a digital second count value by performing count processing on the digital signal outputted from the resetter.

13. The imaging unit according to claim 12, further comprising a threshold setter that sets the first threshold on a basis of a second count value generated by the digital counter.

14. The imaging unit according to claim 7, wherein the pulse responder includes an avalanche photodiode and a quench circuit coupled in series to the avalanche photodiode.

15. An imaging unit comprising:

a plurality of pixels disposed in a matrix form;

a signal processor that generates image data on a basis of pixel data obtained from each of the pixels, wherein each of the pixels includes a pulse responder that generates a pulse signal in response to light incidence, an analog counter that generates an analog first count value by performing count processing on a basis of the pulse signal, and a resetter that resets a first count value when the first count value exceeds a first threshold, wherein the resetter outputs, when the first count value exceeds the first threshold, a digital signal indicating that the first count value exceeds the first threshold;

wherein the signal processor includes a first digital counter that generates a digital second count value by performing count processing on the digital signal outputted from the resetter, and an A/D converter that generates a digital third count value by performing A/D conversion on the first count value; and wherein each of the pixels further includes a first switcher that performs switching between an output of the digital signal and an output of the first count value, and the imaging unit further comprises a second switcher that inputs an output of the first switcher to the first digital counter or the A/D converter.

\* \* \* \* \*